US007953444B2

(12) United States Patent
Kinney et al.

(10) Patent No.: US 7,953,444 B2
(45) Date of Patent: **\*May 31, 2011**

(54) RADIO CARD HAVING INDEPENDENT ANTENNA INTERFACE SUPPORTING ANTENNA DIVERSITY

(75) Inventors: Patrick W. Kinney, Marion, IA (US);
Ronald L. Mahany, Cedar Rapids, IA (US); Guy J. West, Duluth, GA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/342,681

(22) Filed: Dec. 23, 2008

(65) Prior Publication Data

US 2009/0167618 A1 Jul. 2, 2009

Related U.S. Application Data

(63) Continuation of application No. 11/006,325, filed on Dec. 7, 2004, now Pat. No. 7,469,150, which is a continuation of application No. 09/619,990, filed on Jul. 20, 2000, now Pat. No. 6,928,302, which is a continuation of application No. 08/960,194, filed on Oct. 29, 1997, now abandoned, which is a continuation of application No. 08/431,077, filed on Apr. 27, 1995, now abandoned, which is a continuation-in-part of application No. 08/401,526, filed on Mar. 10, 1995, now abandoned, which is a continuation-in-part of application No. 08/258,285, filed on Jun. 10, 1994, now Pat. No. 5,708,833, which is a continuation-in-part of application No. 08/226,256, filed on Apr. 11, 1994, now abandoned, which is a continuation-in-part of application No. 08/194,178, filed on Feb. 9, 1994, now abandoned, which is a continuation-in-part of application No. 08/154,020, filed on Nov. 17, 1993, now abandoned, which is a continuation-in-part of application No. 08/107,470, filed on Aug. 17, 1993, now abandoned, which is a continuation-in-part of application No. 08/081,411, filed on Jun. 22, 1993, now abandoned, which is a continuation-in-part of application No. 08/053,901, filed on Apr. 27, 1993, now abandoned, application No. 08/154,020, which is a continuation-in-part of application No. 08/097,462, filed on Jul. 26, 1993, now Pat. No. 5,590,346.

(51) Int. Cl.
*H04B 1/38* (2006.01)

(52) U.S. Cl. ............ 455/558; 455/556.1; 455/347

(58) Field of Classification Search .......... 235/492, 235/472.02; 455/558, 575.1, 90.3, 556.1, 455/556.2, 557, 559, 550.1, 344, 347, 899, 455/235, 472.02, 462.46
See application file for complete search history.

(56) References Cited

U.S. PATENT DOCUMENTS 3,763,512 A 10/1973 Valihora
(Continued)

OTHER PUBLICATIONS

C. Patton, "Radio Transceiver Circuit Card Acts As Wireless Modem in PCs," Mar. 1998, InforWorld, p. 18.

*Primary Examiner* — Melur Ramakrishnaiah
(74) *Attorney, Agent, or Firm* — McAndrews, Held & Malloy, Ltd.

(57) ABSTRACT

A radio card, such as a PCMCIA card, received by an electronic device has a first interface coupling radio circuitry within the radio card to the electronic device. The radio card also has a second interface, independent of the first interface, that couples with an antenna disposed within the electronic device upon receipt of the radio card by the electronic device. The second interface may comprise a plurality of antenna contacts located along tracks of the electronic device used to aid reception of the radio card. A second and possibly external antenna may also automatically couple with the second interface upon insertion. By selective placement of the antenna contacts on the radio card, a specific one of the antennas may be selected. Otherwise, internal switching circuitry supports antenna diversity or simultaneous use of a plurality of antennas.

23 Claims, 32 Drawing Sheets

U.S. PATENT DOCUMENTS

| | | | |
|---|---|---|---|
| 4,058,838 A | 11/1977 | Crager et al. | |
| 4,519,068 A | 5/1985 | Krebs et al. | |
| 4,569,421 A | 2/1986 | Sandstedt | |
| 4,628,193 A | 12/1986 | Blum | |
| 4,661,993 A | 4/1987 | Leland et al. | |
| 4,680,787 A | 7/1987 | Marry | |
| 4,761,822 A | 8/1988 | Maile | |
| 4,789,983 A | 12/1988 | Acampora et al. | |
| 4,806,906 A | 2/1989 | Oda et al. | |
| 4,850,009 A | 7/1989 | Zook et al. | |
| 4,890,114 A | 12/1989 | Egashura | |
| 4,916,441 A | 4/1990 | Gombrich | |
| 4,940,992 A | 7/1990 | Nguyen et al. | |
| 4,969,206 A | 11/1990 | Desrochers | |
| 5,008,879 A | 4/1991 | Fischer et al. | |
| 5,033,109 A | 7/1991 | Kawano et al. | |
| 5,055,660 A | 10/1991 | Bertagna et al. | |
| 5,070,340 A | 12/1991 | Diaz | |
| 5,097,484 A | 3/1992 | Akaiwa | |
| 5,117,501 A | 5/1992 | Childress et al. | |
| 5,118,309 A | 6/1992 | Ford | |
| 5,138,651 A | 8/1992 | Sudo | |
| 5,202,817 A | 4/1993 | Koenck et al. | |
| 5,204,687 A | 4/1993 | Elliott et al. | |
| 5,249,218 A | 9/1993 | Sainton | |
| 5,266,782 A | 11/1993 | Alanara et al. | |
| 5,266,785 A | 11/1993 | Sugihara et al. | |
| 5,325,429 A | 6/1994 | Kurgan | |
| 5,333,177 A | 7/1994 | Braitberg et al. | |
| 5,353,328 A | 10/1994 | Jokimies | |
| 5,359,598 A | 10/1994 | Steagall et al. | |
| 5,361,061 A | 11/1994 | Mays et al. | |
| 5,371,508 A | 12/1994 | Teich et al. | |
| 5,373,149 A * | 12/1994 | Rasmussen | 235/492 |
| 5,410,141 A * | 4/1995 | Koenck et al. | 235/472.02 |
| 5,420,599 A | 5/1995 | Erkocevic | |
| 5,422,656 A | 6/1995 | Allard et al. | |
| 5,434,854 A | 7/1995 | Focarile et al. | |
| 5,440,449 A | 8/1995 | Scheer | |
| 5,445,525 A | 8/1995 | Broadbent et al. | |
| 5,446,736 A | 8/1995 | Gleeson et al. | |
| 5,483,576 A | 1/1996 | Staples | |
| 5,485,505 A | 1/1996 | Norman et al. | |
| 5,532,708 A | 7/1996 | Krenz et al. | |
| 5,559,501 A | 9/1996 | Barzegar et al. | |
| 5,589,835 A | 12/1996 | Gildea et al. | |
| 5,590,346 A | 12/1996 | West et al. | |
| 5,606,732 A | 2/1997 | Vignone | |
| 5,608,863 A | 3/1997 | Ishizawa et al. | |
| 5,680,633 A | 10/1997 | Koenck et al. | |
| 5,708,833 A | 1/1998 | Kinney et al. | |
| 5,960,344 A | 9/1999 | Mahany | |
| 6,012,634 A | 1/2000 | Brogan et al. | |
| 6,295,031 B1 | 9/2001 | Wallace et al. | |
| 2003/0128167 A1 | 7/2003 | Beard et al. | |

* cited by examiner

RADIO CARD HAVING INDEPENDENT ANTENNA INTERFACE SUPPORTING ANTENNA DIVERSITY

CROSS-REFERENCE TO RELATED APPLICATIONS

The present application is a CONTINUATION of U.S. application Ser. No. 11/006,325, filed Dec. 7, 2004 now U.S. Pat. No. 7,469,150, which is a CONTINUATION of U.S. application Ser. No. 09/619,990, filed Jul. 20, 2000, now issued U.S. Pat. No. 6,928,302, which is a CONTINUATION of U.S. application Ser. No. 08/960,194, filed Oct. 29, 1997, now abandoned, which is a CONTINUATION of U.S. application Ser. No. 08/431,077, filed Apr. 27, 1995, now abandoned, which is a CONTINUATION-IN-PART of U.S. application Ser. No. 08/401,526, filed Mar. 10, 1995, now abandoned, which is a CONTINUATION-IN-PART of U.S. application Ser. No. 08/258,285, filed Jun. 10, 1994, now issued U.S. Pat. No. 5,708,833, which is a CONTINUATION-IN-PART of U.S. application Ser. No. 08/226,256 filed Apr. 11, 1994, now abandoned, which is a CONTINUATION-IN-PART of U.S. application Ser. No. 08/194,178, filed Feb. 9, 1994, now abandoned, which is a CONTINUATION-IN-PART of U.S. application Ser. No. 08/154,020, filed Nov. 17, 1993, now abandoned, which is a CONTINUATION-IN-PART of U.S. application Ser. No. 08/107,470, filed Aug. 17, 1993, now abandoned, which is a CONTINUATION-IN-PART of U.S. application Ser. No. 08/081,411, filed Jun. 22, 1993, now abandoned, which is a CONTINUATION-IN-PART of U.S. application Ser. No. 08/053,901, filed Apr. 27, 1993, now abandoned. Said U.S. application Ser. No. 08/154,020 is also a CONTINUATION-IN-PART of U.S. application Ser. No. 08/097,462, filed Jul. 26, 1993, now issued U.S. Pat. No. 5,590,346.

The above-identified applications are hereby incorporated herein by reference in their entirety.

AUTHORIZATION PURSUANT TO 37 C.F.R. 1.71(d)(e)

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

RELATED APPLICATIONS

The present application is related to U.S. application Ser. No. 08/114,872, filed Aug. 31, 1993, now issued U.S. Pat. No. 5,680,633, which is hereby incorporated by reference in its entirety.

The present application is related to U.S. application Ser. No. 08/258,285, now U.S. Pat. No. 5,708,833, which is incorporated by reference in its entirety.

TECHNICAL FIELD

The present invention relates generally to computer devices utilizing removable radio frequency communication devices used for transmitting and receiving information and more particularly to an improved apparatus for connecting an appropriate antenna to the radio frequency communication device using an antenna cap, and to an improved method and apparatus for connecting a communication card device such as a radio or modem to an appropriate antenna or telephone line.

BACKGROUND ART

Many computer devices use modular components to allow increased flexibility and adaptability to various work environments. This is especially true in the area of small computing devices such as hand held computer terminals, vehicle mounted computer terminals and small lap-top computers. Along these lines, small, removable and interchangeable memory cards were developed. The memory cards have now become commonplace and the PCMCIA memory card standard has become accepted industry wide as the format to use.

The PCMCIA memory cards are relatively small having a length and width roughly the size of a credit card. The thickness of these cards is more than that of a credit card and there are several thicknesses used for different cards. These cards are designed to slide into a receiving portion of some computer device. At one end of the card is an interface section which is in essence the female portion of a connector that mates with the male end in the receiving device. All of this, including the number of pins, the layout of the pins, and the pin size for the connection, are all part of the PCMCIA standard.

The success of the removable and interchangeable PCMCIA memory cards has led to the development of other types of peripheral devices that use the same standard. Of particular interest to the present application are the cards that contain radio transceivers and modems. These devices can be inserted into and connected to a receiving device in the same manner as a memory card. However, with these devices there is an additional connection which must be made to connect a radio antenna, a telephone line, a cellular phone, or an antenna for the cellular phone.

Radio frequency communication allows two or more computer terminals to communicate without actually being wired together. Many types of radio communication exist and many different radio frequencies and frequency ranges can and must be used to accommodate the different types of radio communication. For example, a radio that operates by sending the information on a single channel in the UHF band differs greatly from a radio that sends its information utilizing spread spectrum frequency hopping in the 2400-2483 MHz range. The antennas necessary to operate in the different frequency ranges also differ. Similarly, modem communication, whether connected by traditional phone lines or by cellular phones, allow computer devices that are not hardwired together to exchange information.

Connection of the radio card or modem card to an outside antenna or telephone line is typically made by either extending the length of the card beyond the standard card length with the antenna or connection built into the extended portion or by having an antenna or telephone cable protrude out of the end of the radio card to which the user may attach an antenna or telephone line. These options have significant limitation. Both connections severely limit the type of device that can accommodate the cards. Most devices cannot accommodate the extra length without some modification and both connections make environmentally sealing the connections difficult. Additionally, both connections are susceptible to increased damage from dropping or other physical trauma. An external antenna to which the user must couple an antenna is inconvenient and subjects the radio periods of unreliability due to wear of the cable and connection.

An additional problem is converting computer devices that were not designed to utilize radio or modem cards, and thus have no built in or attached antenna, into devices that can utilize radio and modem cards while still avoiding the various antenna connection problems discussed above.

Thus, there is a need in a computer terminal for an improved apparatus for connecting a removable card type radio or modem to an antenna or telephone line attached to or built within the computer terminal. Additionally, there is a need for an improved computer device apparatus for connecting a removable card type radio to a protected, interchangeable, environmentally sealed antenna.

DISCLOSURE OF THE INVENTION

The present invention relates generally to computer devices utilizing removable radio frequency communication devices used for transmitting and receiving information and more particularly to an improved apparatus for connecting an appropriate antenna to the radio frequency communication device using an antenna cap, and to an improved method and apparatus for connecting a communication card device such as a radio or modem to an appropriate antenna or telephone line, and connecting a communication card device such as a radio or modem to a power source.

In one embodiment, a removable radio card can be inserted into a receiving device which is part of a computer terminal. The radio card has an electrical interface which engages with an interface on the receiving device. The interface on the receiving device is connected to the computer terminal and when the interfaces are engaged, communication between the radio card and the computer terminal is possible. Additionally, the receiving device is connected to at least one antenna by means of an antenna cable which has a pair of contacts located on the receiving device. This pair of receiving device antenna contacts encounter a pair of antenna contacts on the radio card. This connection allows the radio card to utilize an antenna located on or within the receiving device. Additionally, the connection of a modem card to a telephone, cellular phone, or antenna for a cellular phone can be accomplished in substantially the same manner.

In another embodiment of the present invention a radio card or modem card which is inserted into the computer terminal contains one set of contacts which encounter a corresponding set of contacts located on the receiving device. The receiving device contacts are connected to a switching matrix which is in turn connected to at least one of radio frequency antennas, a cellular phone, an antenna for cellular phone, or a jack for connection to a standard telephone line. As part of the regular communication with the radio card or modem card the computer terminal interrogates the radio card or modem card and determines to which antenna or telephone line the card should be connected.

In still another embodiment of the present invention the radio card antenna contacts are at the opposite end of the radio card with respect to the electrical interface. In this embodiment, the computer device includes a cap which engages with the opening in the housing through which the radio card was inserted. The cap includes antenna contacts positioned to engage the radio card antenna contacts. The cap is connected to one end of a band. The other end of the band is connected to the housing of the computer device. An antenna can be embedded in the cap, embedded in the band or embedded in or on the housing of the computer device. Connection of the antenna contacts on the cap and of the antenna is accomplished through the cap and utilizes either wire connections or a micro shield ribbon.

Different radio cards may transmit on different frequencies and therefore need different antennas. Multiple antennas allow the radio cards to selectively transmit and receive on different antennas based upon the frequency used for communication. Additionally, two similar antennas disposed in different positions can be used to implement an antenna diversity scheme.

Similar to the antenna contacts, power contacts are also positioned on the housing of the radio or modem card to provide needed supplemental power which cannot be provided for by the electrical interface.

In yet another embodiment of the present invention, transmission line characteristics are used to control the power flow from the radio transceiver to the internal and external antennas. Three transmission lines make up the transmission line system with one end of each transmission line meeting at a common point. The radio transceiver is connected to the opposite end of one of the transmission lines. An internal antenna is attached to the opposite end of a second of the transmission lines. The third transmission line is used to attach an optional external antenna. With the external antenna optional, the opposite or load end of the third transmission line can either be open, with no external antenna connected, or loaded to a specific rated antenna, such as 50 ohms, when an external antenna is connected.

Each transmission line has two characteristics: the line impedance and the line length. By carefully selecting the line impedance and line length characteristics for each of the three transmission lines, a desirable VSWR (voltage standing-wave ratio) looking into the radio transceiver end of the first transmission line can be achieved. Also by carefully selecting the line impedance and line length characteristics for each of the three transmission lines a desirable power ratio between the second and third transmission line can be achieved in both the case when an external antenna is attached and in the case where the external antenna is not attached. Thus, an antenna selection or switching system is accomplished without the need for a physical or electronic switch.

An object of the present invention is to provide an improved antenna connector for use with radio cards which can be inserted into various computer devices.

Another object of the present invention is to provide an improved antenna connector which is reliable, economical and easy to use.

A further object of the present invention is to provide an improved antenna connector whereby an appropriate antenna will be connected to a radio card by selectively positioning the antenna contacts on the radio card.

Another object of the present invention is to provide an improved antenna connector whereby a radio card may simultaneously connect to and utilize more than one radio antenna.

Still another object of the present invention is to provide an improved apparatus for connecting a modem card to a telephone line, cellular telephone or antenna for a cellular phone.

A further object of the present invention is to provide an improved apparatus which utilizes only one set of contacts on the radio card or modem card and uses a switching matrix to connect the radio card or modem card to the appropriate antenna or telephone line.

Another object of the present invention is to provide an antenna cap for use with computer devices utilizing radio cards.

Another object of the present invention is to provide an antenna cap which is reliable, economical and easy to use.

A further object of the present invention is to provide an antenna cap whereby an appropriate antenna will be connected to a radio card by selectively positioning the antenna contacts on the radio card.

Another object of the present invention is to provide an antenna cap whereby a radio card may simultaneously connect to and utilize more than one radio antenna.

Still another object of the present invention is to provide an antenna cap which provides an antenna for computer devices which do not have a built in antenna.

Still another object of the present invention is to provide an improved apparatus for supplying power for radio and modem cards which utilize power contacts positioned on the side of the radio and modem cards.

A further object of the present invention is to for an antenna selection or switching system which utilizes the transmission lines impedances and lengths to divert a significant portion of the available power to the appropriate antenna.

Other objects, advantages, and novel features of the present invention will become apparent from the following detailed description of the invention when considered in conjunction with the accompanying drawings.

BEST MODES FOR CARRYING OUT THE INVENTION

Figure 1:
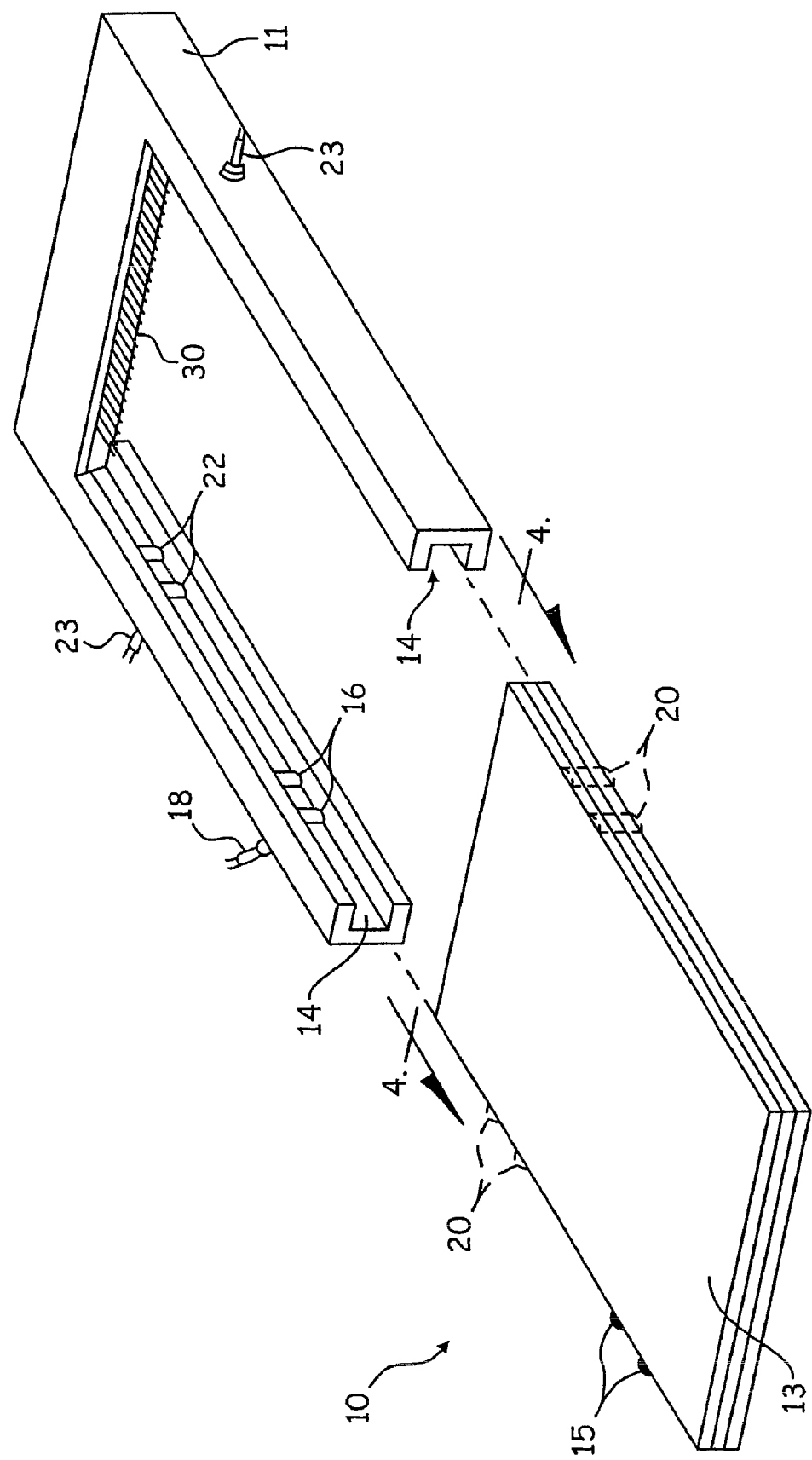
FIG. 1 is a perspective view of a radio card and a corresponding port for receiving the radio card built in accordance with the present invention.

Referring now to the drawings wherein like reference numerals designate identical or corresponding parts throughout the several views, FIG. 1 shows a radio card (10) and a receiving device (11) built in accordance with the present invention. The radio card (10) has a housing (13) inside which is a completely operation radio transceiver (not shown). The receiving device (11) in this embodiment of the present invention uses a pair of opposed slots (14) to receive and guide the incoming radio card (10).

Figure 2:
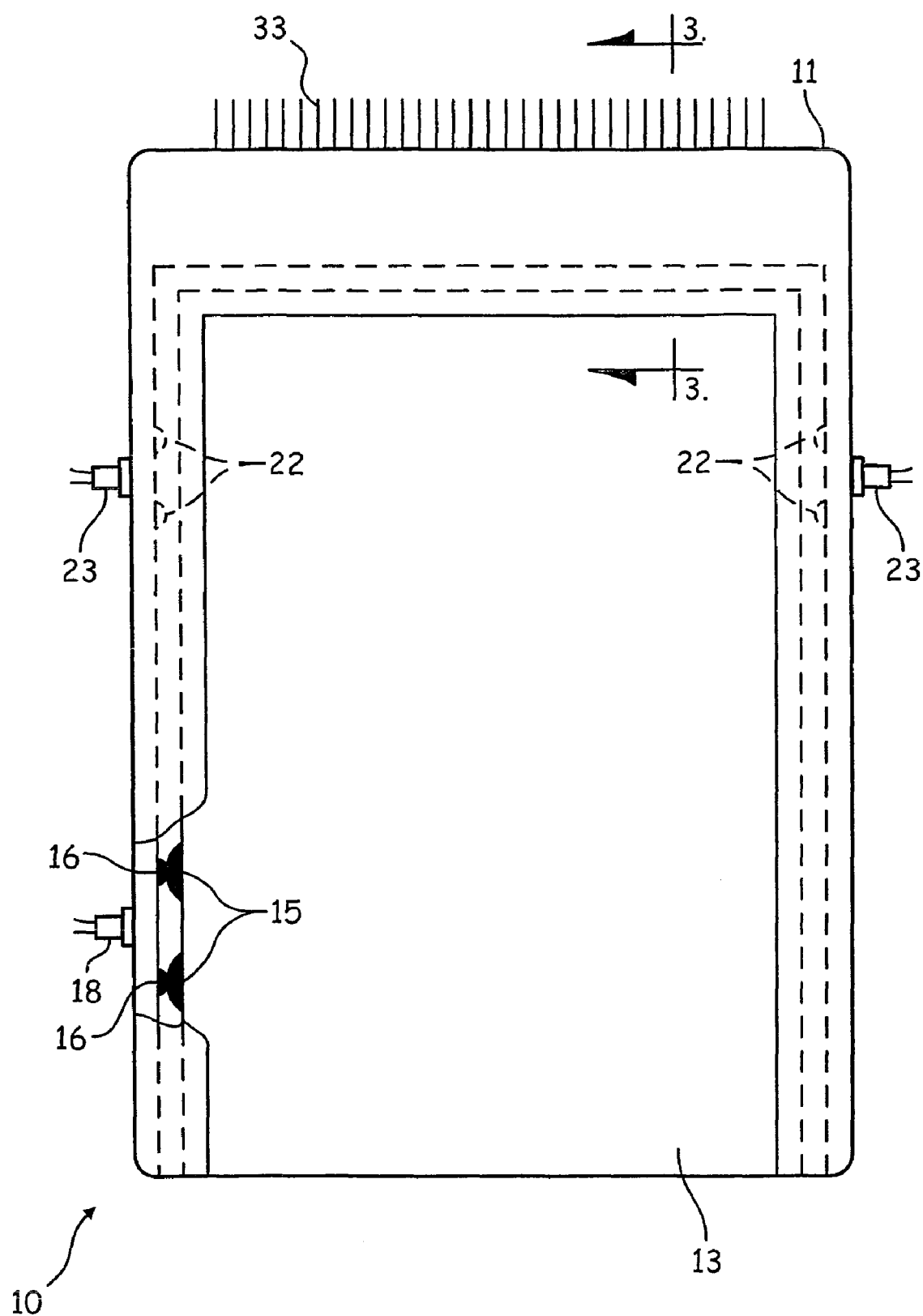
FIG. 2 is a partial top plan view of a radio card and port for receiving the radio card with the radio card completely inserted in the port.

The radio card (10) has a pair of antenna contacts (15) positioned along the edge of the housing (13). The receiving device (11) has a corresponding pair of antenna contacts (16). As can be seen in FIG. 2, when the radio card (10) is fully inserted into the receiving device (11) the antenna contacts (15) on the radio card housing (13) electrically encounter the corresponding set of antenna contacts (16) positioned on the receiving device (11). The antenna contacts (16) on the receiving device (11) are connected to an antenna cable (18). The antenna cable (18) is in turn connected to an antenna (not shown). Thus, when the radio card (10) is fully inserted into the receiving device (11) the radio card (10) automatically is connected to an antenna.

Referring again to FIG. 1, a radio card (10) may have antenna contacts (20), shown in dashed lines, located at different positions on the housing (13). Similarly, the receiving device (11) may have several additional pairs of antenna contacts (22). The additional pairs of antenna contacts (22) on the receiving device (13) can be used to allow access to several different antennas depending on the type and frequency of radio communication to be utilized by the radio card (10). This access is accomplished through additional antenna cables (23) attached to the additional contacts (22). Thus, if the receiving device (13) is part of a hand held computer terminal which has more than one antenna attached or built in, different pairs of contacts (16 & 22) can be used to allow access by the radio card to the different antennas depending upon the frequency and range characteristics of each antenna. While a radio card (10) may only operate at one frequency and thereby only need one antenna and therefore only have one pair of antenna contacts, the receiving device (11) still may have several pairs of antenna contacts (16 & 22) all but one of which do not correspond to any pair of radio card (10) antenna contacts (15).

Figure 3:
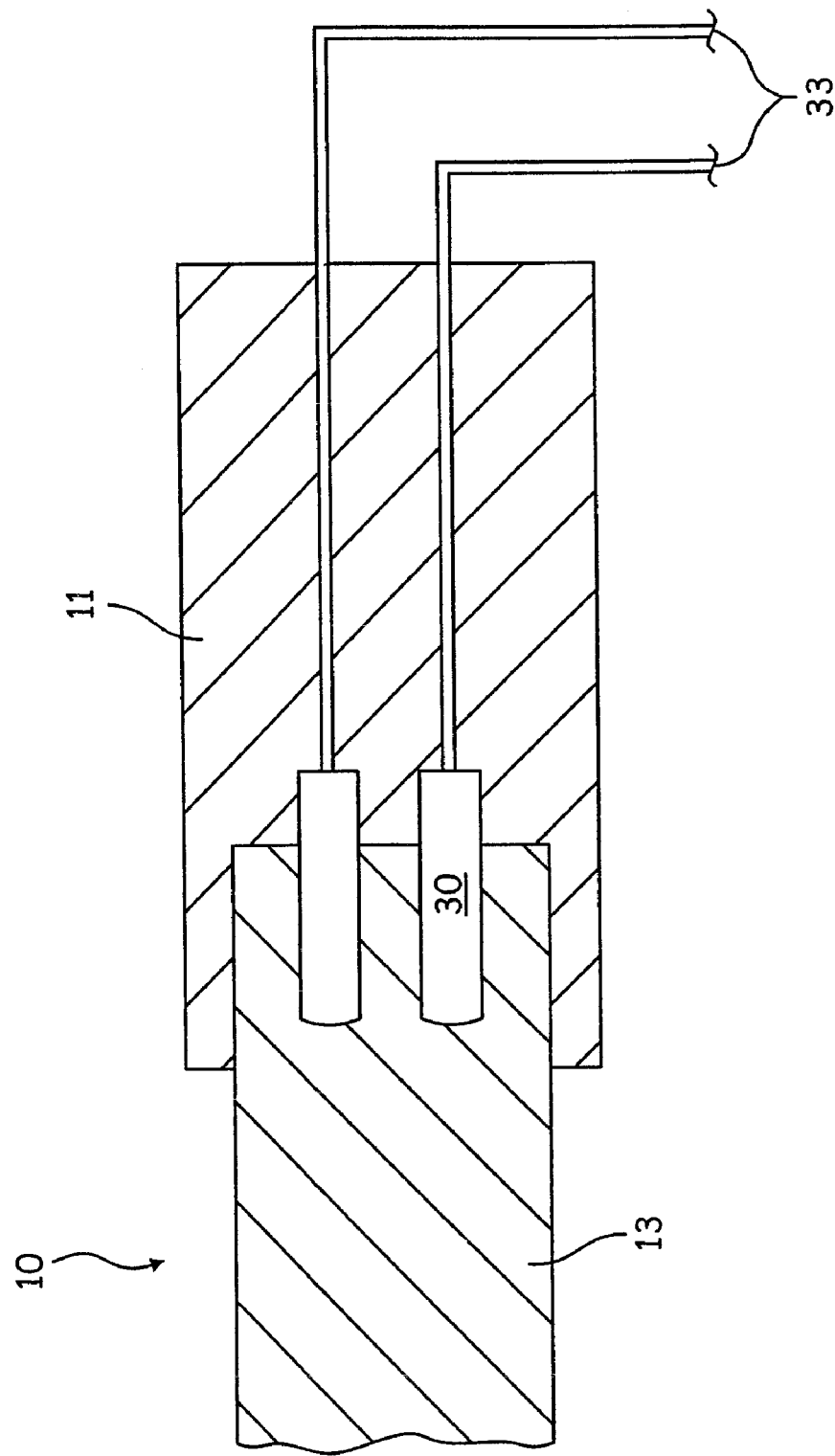
FIG. 3 is a partial side elevational view taken along line 3-3 showing the male/female pin connection of the radio card and the port of FIG. 2.
Figure 4:
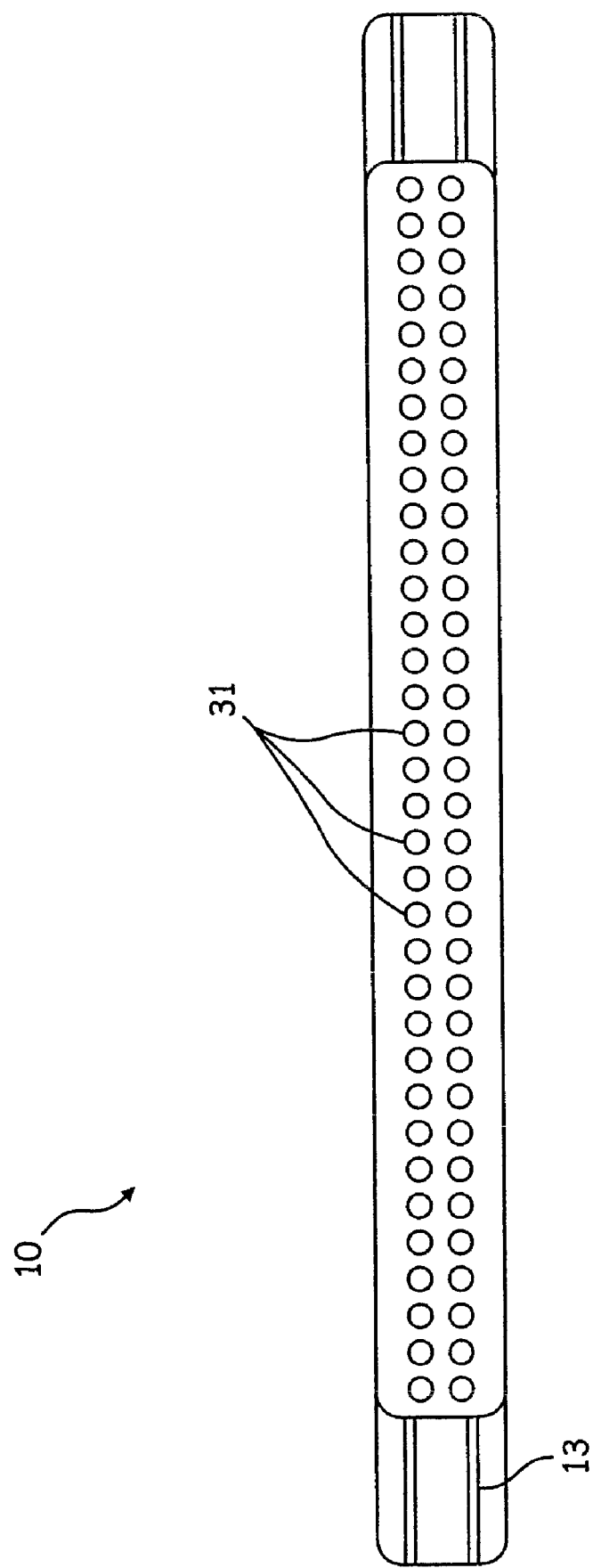
FIG. 4 is a front view taken along line 4-4 showing the female pin connections of the radio card of FIG. 1.

Referring to FIGS. 3 and 4, when the radio card (10) is inserted into the receiving device (11) an interface between the radio card (10) and the receiving device (11) is produced. The receiving device (11) has a plurality of pins (30) which form the male portion of a connector. The radio card (10) has a corresponding plurality of holes (31) which form the female portion of the connector and which engage the pins (30). The pins (30) are connected to the computer terminal (not shown) by a series of electrical connections (33) such as wires or electrical ribbon. The holes (31) in the radio card (10) are electrically connected to the radio. When the pins (30) are engaged in the holes (31), electrical signals can be exchanged between the radio card (10) and the computer terminal. The electrical signals can be in the form of information exchange, power supply or both.

Referring to a radio card (10) is shown in accordance with the present invention. The radio card (10) has a housing (13) and contains a radio transceiver (10A). The radio transceiver (10A) is electrically connected to an antenna contact block (17), which may for example be a pair of antenna contacts (15, FIG. 2). The radio card (10) may optionally have additional antenna contacts (see 20, FIG. 1) electrically connected to the radio transceiver (10A).

Figure 2A:
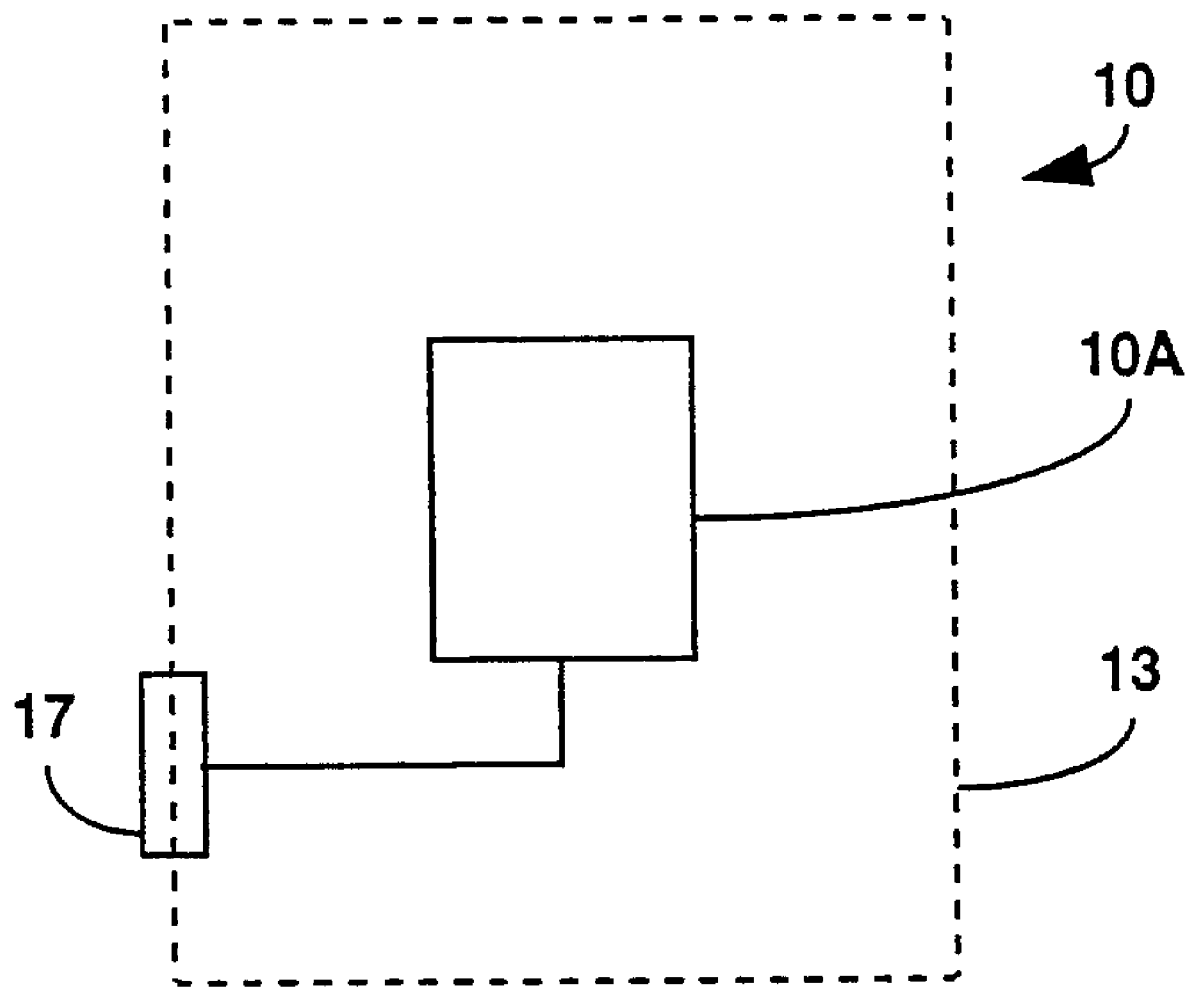

The radio transceiver (10A) is not shown in FIG. 2A to scale, nor are the relative positions of the radio transceiver (10A) or the antenna contact block (17) on the radio card (10) drawn for accuracy; FIG. 2A is a block diagram intended only to show functional blocks of the radio card (10).

The radio card (10) of FIGS. 1-4 might also be a modem card (not shown). In this embodiment, the connections would be the same as previously described with the only difference being that instead of the contacts connecting the modem card to a radio antenna, the modem card would be connected to a traditional telephone line, a cellular phone or an antenna for a cellular phone if the cellular phone was contained within the modem card. Any necessary coupling transformer may be built within the computer terminal.

Figure 5:
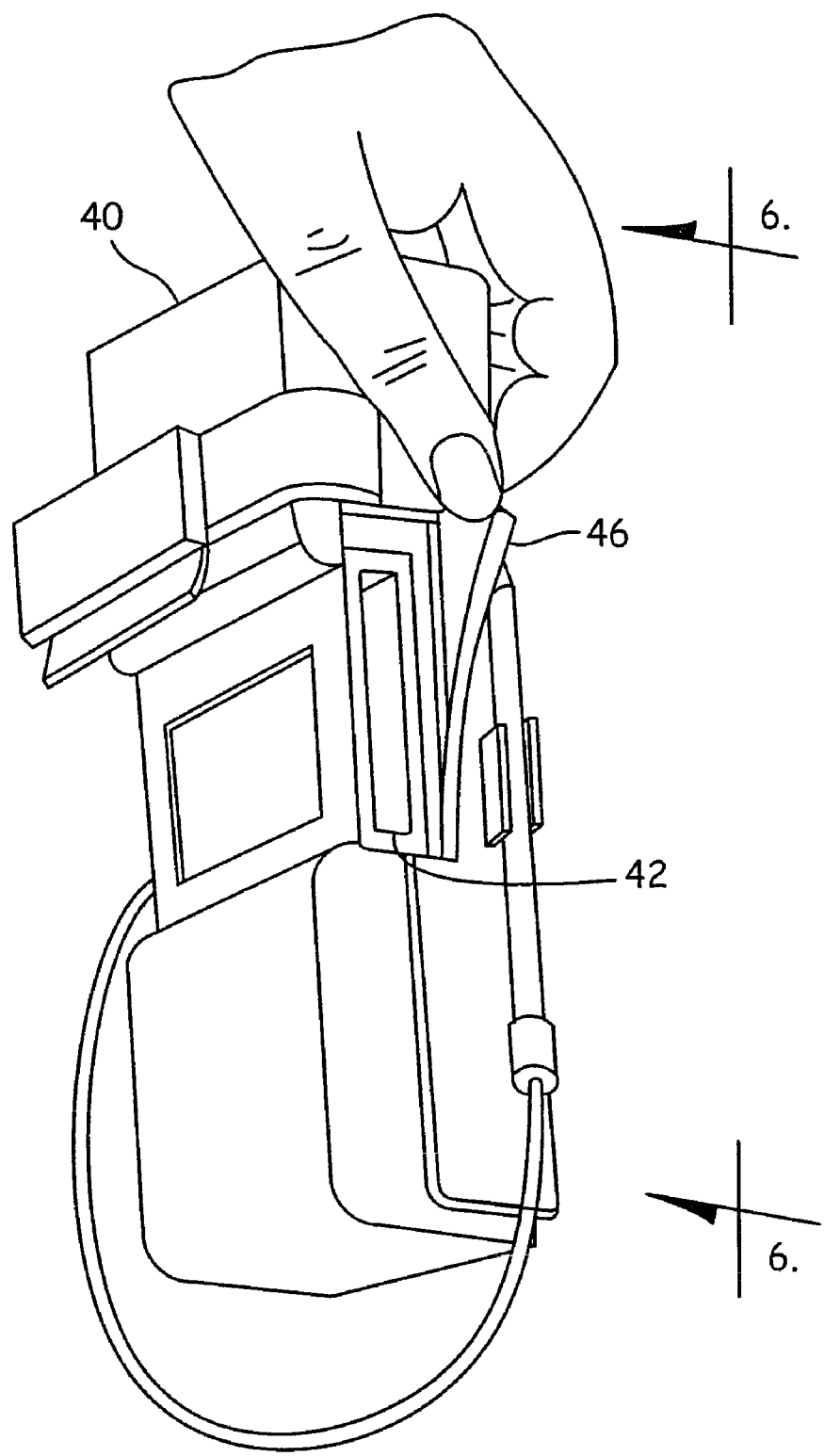
FIG. 5 is a perspective view of computer terminal showing the slot for receiving the radio card.
Figure 6:
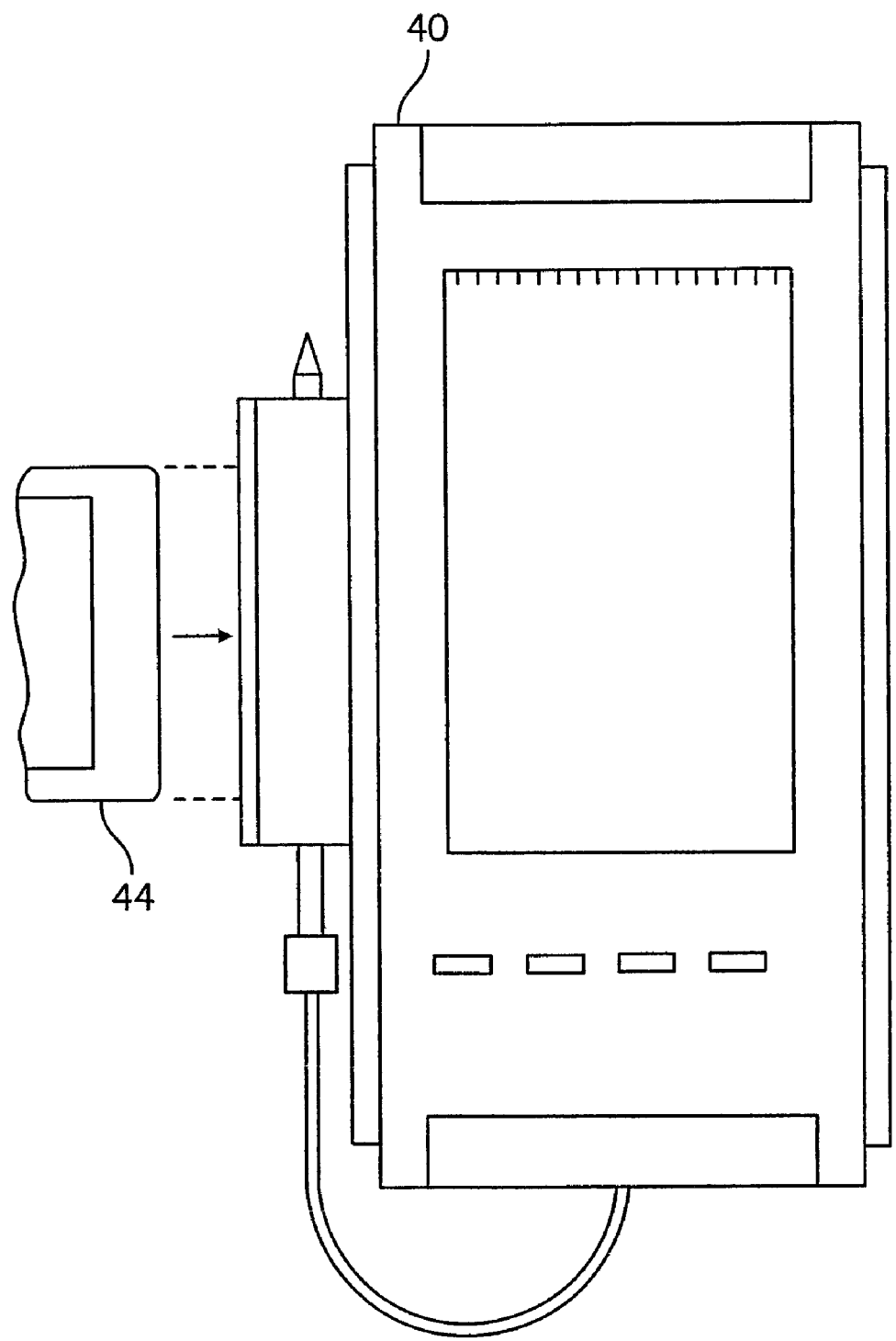
FIG. 6 is front view taken along line 6-6 showing how a radio card to be inserted into the slot of the computer terminal of FIG. 5.

Referring to FIGS. 5 and 6, a computer terminal (40) is shown built in accordance with the present invention. The computer terminal (40) has a slot (42) for receiving a radio card (44). The user of the computer terminal (40) lifts up a flexible cover (46) and inserts the radio card (44) into the slot (42). The radio card (44) engages with the computer terminal (40) in a similar manner as described in FIGS. 1-4. The radio card (44) as a pair of antenna contacts (48) which engage with a corresponding pair of contacts inside the computer terminal (40). The pair of antenna contacts inside the computer terminal are connected to a radio antenna (not shown).

Figure 7:
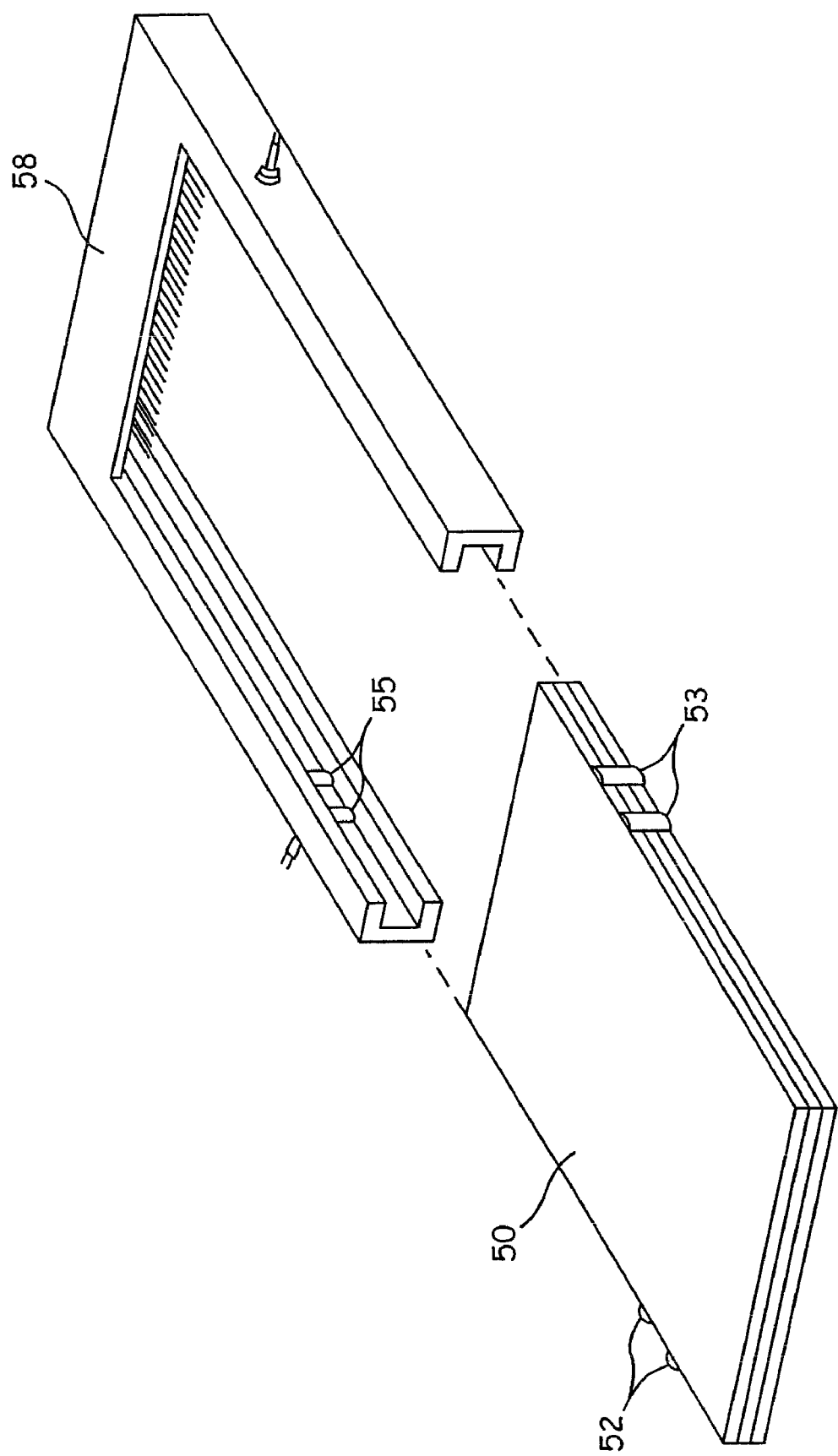
FIG. 7 is a perspective view of another radio card and a corresponding port for receiving the radio card built in accordance with the present invention.
Figure 8:
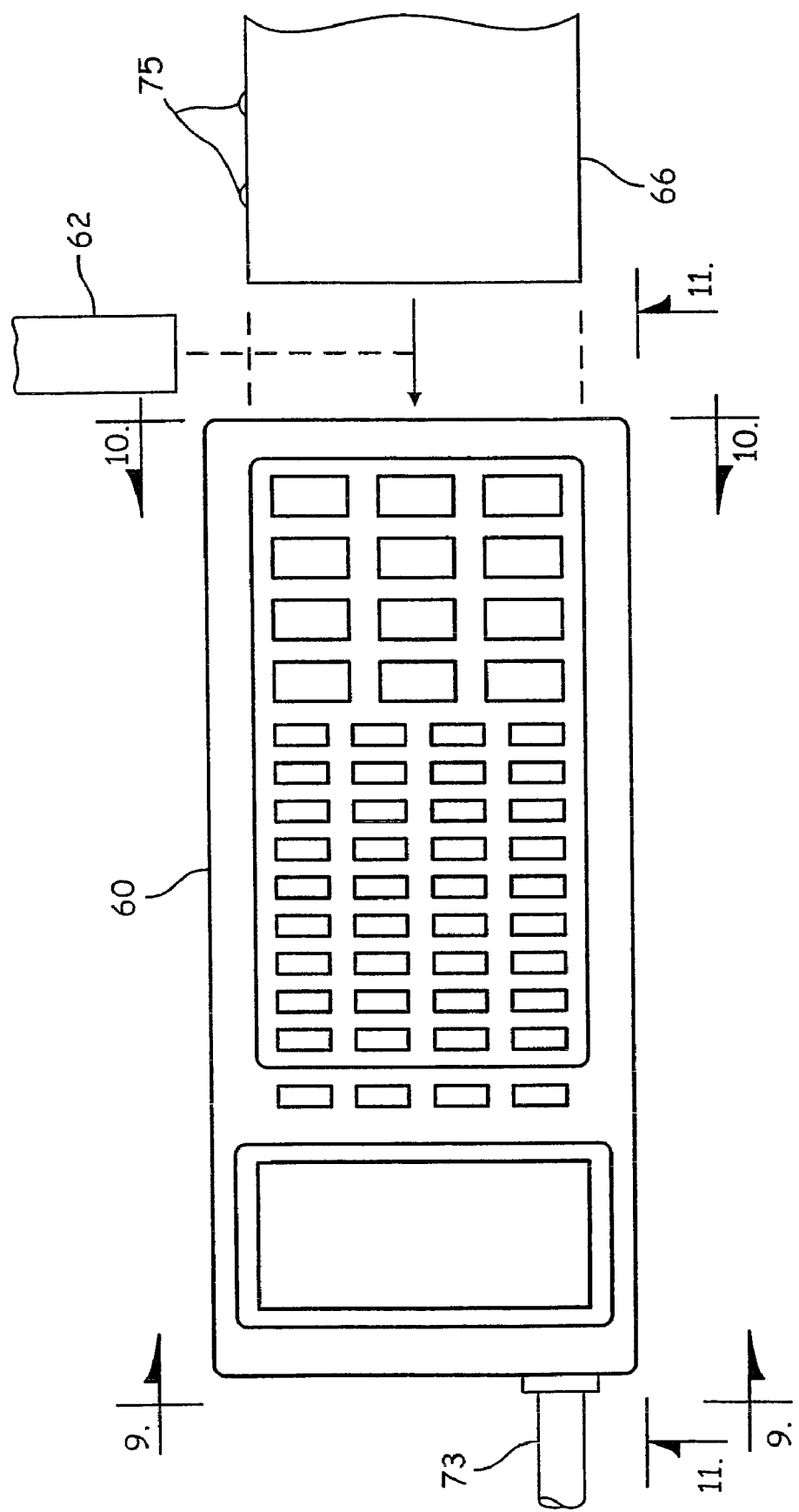
FIG. 8 is a front view of another computer terminal and end cap capable of receiving a radio card.
Figure 10:
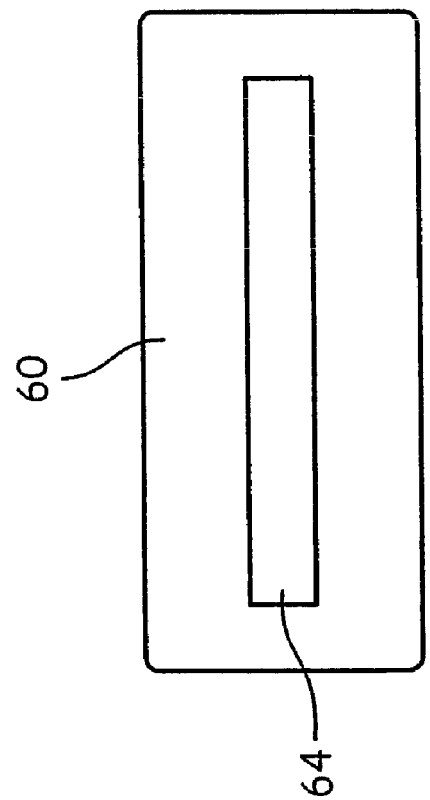
FIG. 10 is a bottom view taken along line 10-10 of the computer terminal of FIG. 8 with the end cap removed.
Figure 9:
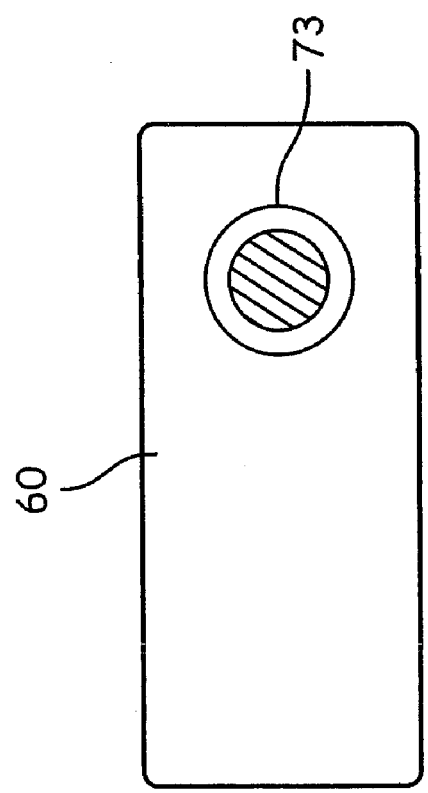
FIG. 9 is a top view taken along line 9-9 of the computer terminal of FIG. 8.
Figure 11:
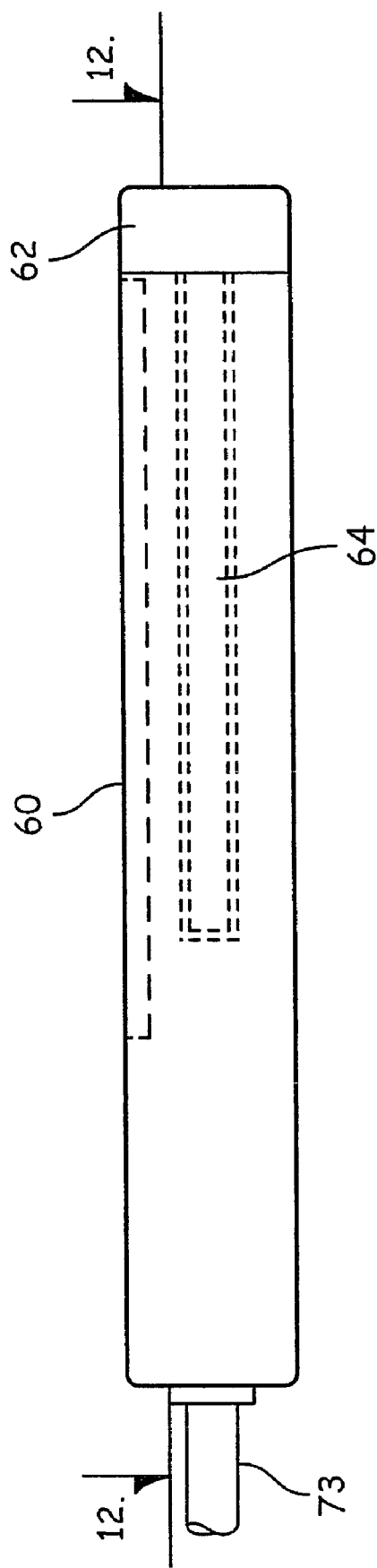
FIG. 11 is a side elevation view taken along line 11-11 of the computer terminal of FIG. 8 with the slot for the radio card shown in dashed lines.
Figure 12:
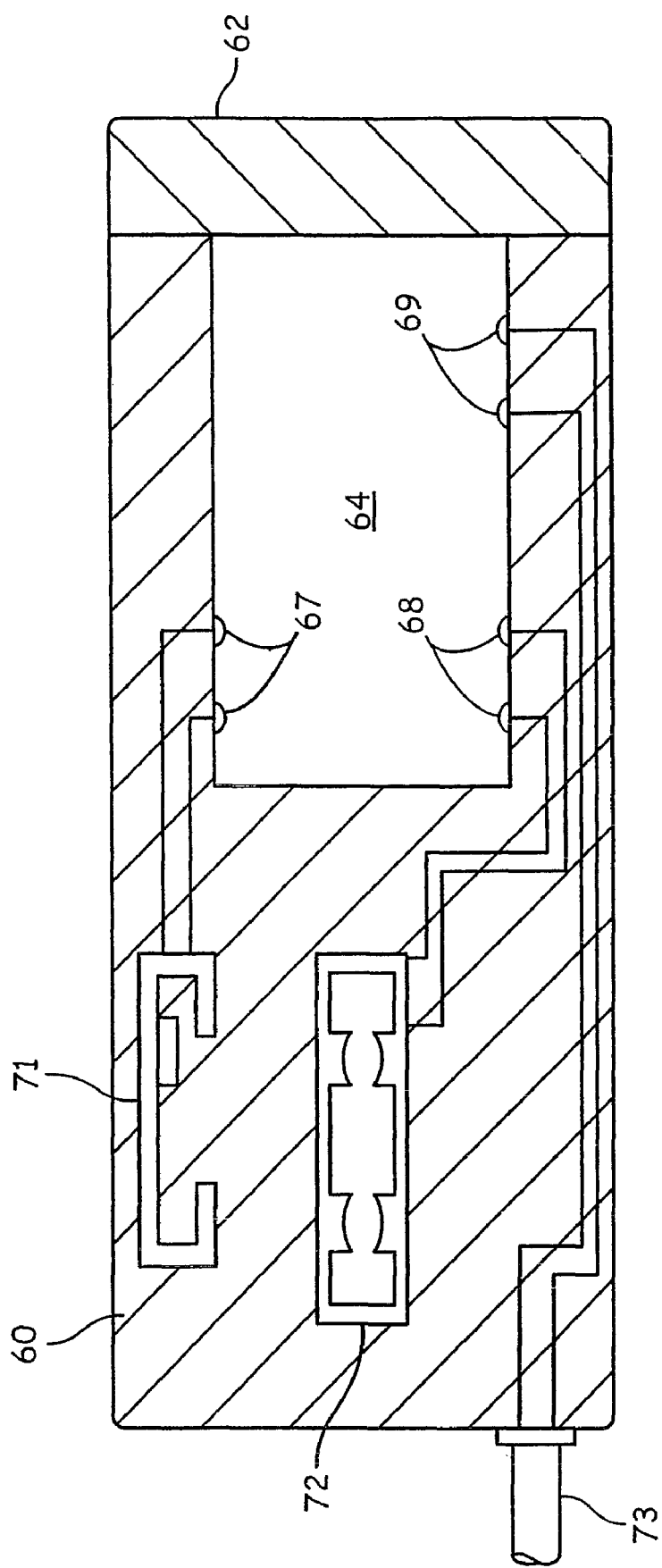
FIG. 12 is a partial top view taken along line 12-12 of the computer terminal of FIG. 11 showing the slot for receiving the radio card and the antennas.

Referring to FIG. 7, another embodiment of the present invention is shown. The radio card (50) has two pairs of antenna contacts (52 & 53) which will encounter respectively two pair of antenna contacts (55 & not shown) on the receiving device (58). This embodiment accommodates a radio card (50) which can operate at two different frequencies which require two different antennas. Standardization of antenna contact position with antenna type is anticipated and covered by the present invention.

Referring to FIGS. 8-12, another embodiment of a computer terminal (60) built in accordance with the present invention is shown. The computer terminal (60) has a removable end cap (62). When the end cap (62) is removed, a slot (60) is revealed which is used to receive a radio card (66). The slot (64) in the computer terminal (60) has three pairs of antenna contacts (67, 68 and 69) which are respectively connected to three different radio antennas (71, 72 and 73). The radio card (66) in this embodiment only has one pair of antenna contacts (75). Thus, when the radio card (66) is inserted into the slot (64), the antenna contacts (75) will match up to the antenna contacts (67) and the radio will utilize the internal antenna (71). The external antenna (73) and the other internal antenna (72) will not be used by this particular radio card (66).

Figure 13:
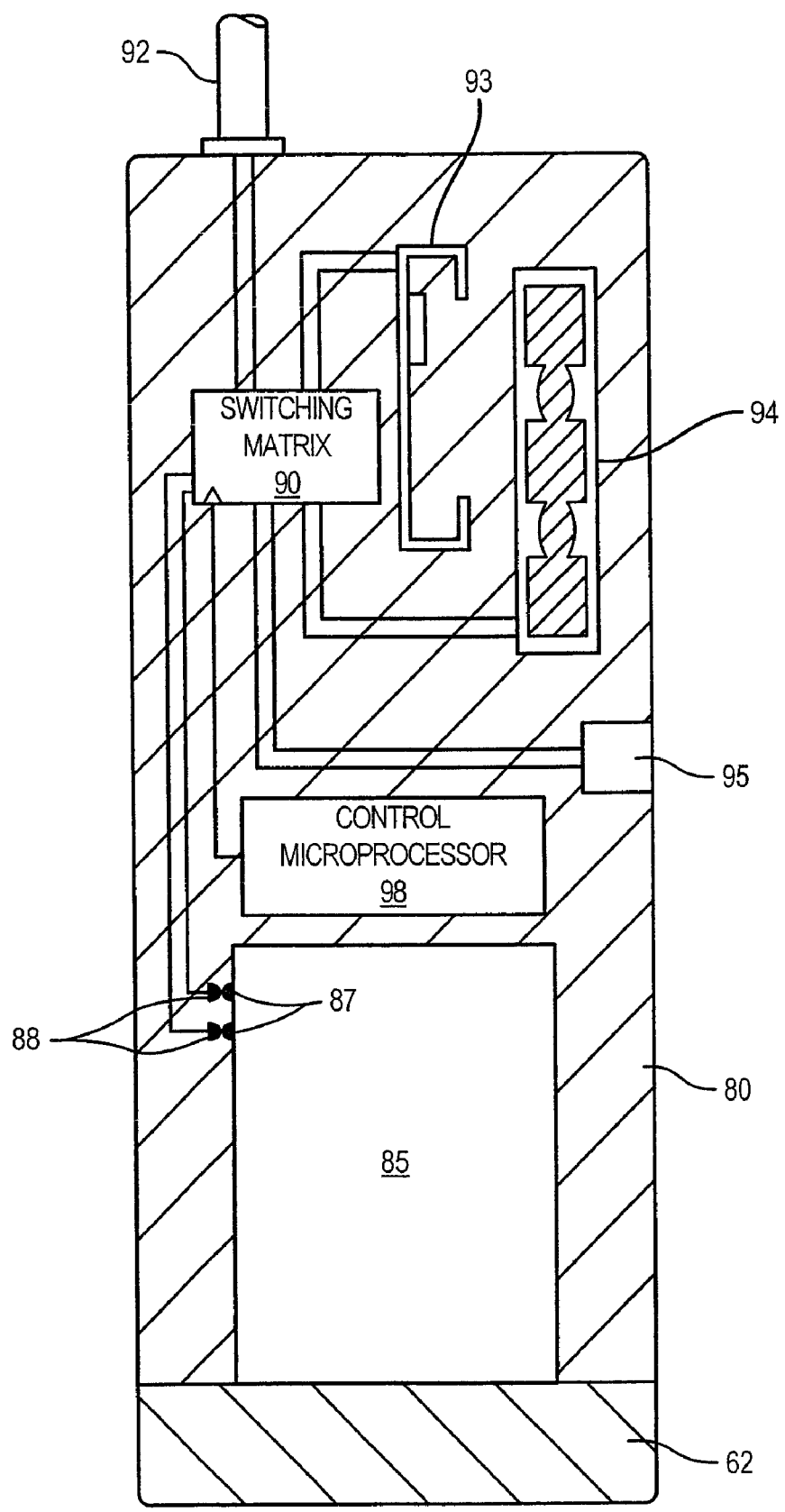
FIG. 13 is a partial top view of yet another embodiment of a computer terminal built in accordance with the present invention showing the use of a switching matrix.

Referring now to FIG. 13, still another embodiment of a computer terminal (80) built in accordance with the present invention is shown. A communication card (85) is inserted into the computer terminal (80). The card (85) can either be a radio card or a modem card. The card (85) has a set or pair of contacts (87) which encounter a set or pair of contacts (88) disposed on the receiving portion of the computer terminal (80). The contacts (88) are electrically connected to a switching matrix (90), thus the radio card or modem card (85) is electrically connected to the switching matrix (90).

The switching matrix (90) is connected to a plurality of antennas (92, 93 and 94) and to a telephone jack (95). The switching matrix (90) is used to electrically and selectively connect the radio or modem card (85) to the appropriate antenna or to a telephone line. The switching matrix (90) is controlled by the control microprocessor (98) of the computer terminal (80). The control microprocessor (98) interrogates the card (85) to determine what kind of card it is and to determine what antenna or telephone connection it needs. The control microprocessor (98) then signals the switching matrix (90) which connects the card (85) to the appropriate antenna (92, 93 or 94) or to the phone jack (95).

It should be noted that the design of a switching matrix which is to accommodate both RF and telephone connections must take into account the different voltage requirements for each type of communication. For example, the Sony CXG1002 switch discussed below cannot handle the range of voltages necessary for compliance with telephone standards.

Figure 29:
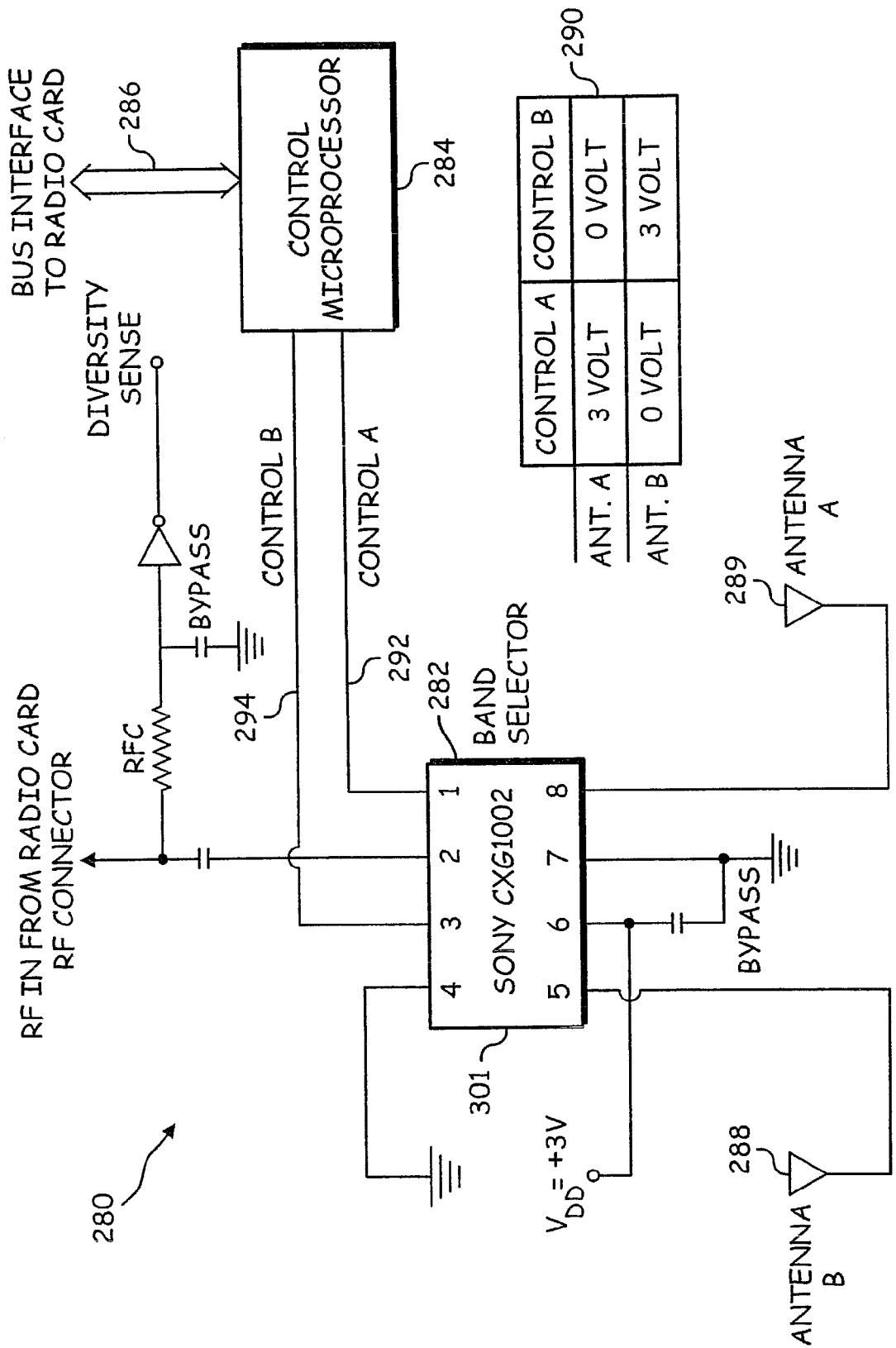
FIG. 29 is a circuit diagram of a switching matrix for microprocessor control of antenna selection.

Referring now to FIG. 29, a circuit diagram (280) for antenna switching matrix is shown. The circuit (280) allows a radio card to be connected to one of two or more internal or connected antennas of a portable computer device. The circuit shown allows antennas (288 and 289) for one of two frequency bands to be selected. The design can be extended to allow additional bands to be added by appropriate selection of a switching device.

The illustrated circuit is based upon a Sony CXG1002 GaAs JFET switch (282). Switching is initiated by the control microprocessor (284) within the computer device. This microprocessor (284) may be a dedicated communications or control microprocessor, or it may be the main processor that runs local applications.

Upon initial power up of the computer device, the control microprocessor (284) interrogates the radio card via the bus interface (286) to ascertain its type and frequency band of operation. PCMCIA standards include provisions for device identification. Based upon the result of the interrogation, the microprocessor (284) selects the appropriate logic levels from a logic level table (290) for application to the Control A line (292) and Control B line (294) to the CXG1002 switch (282) in order to select the proper antenna for the radio card. For example, if the computer device is designed to accommodate 900 MHz paging receivers and 2.4 GHz wireless local area network transceivers, antenna A (288) would be a 900 MHz antenna and antenna B (289) would be a 2.4 GHz antenna.

An optional diversity sense circuit is also shown. This circuit allows the radio card to provide a diversity select signal through the RF connector. The coil (298) is an RF choke, allowing low frequency signals to pass, but blocking RF signals.

Figure 30:
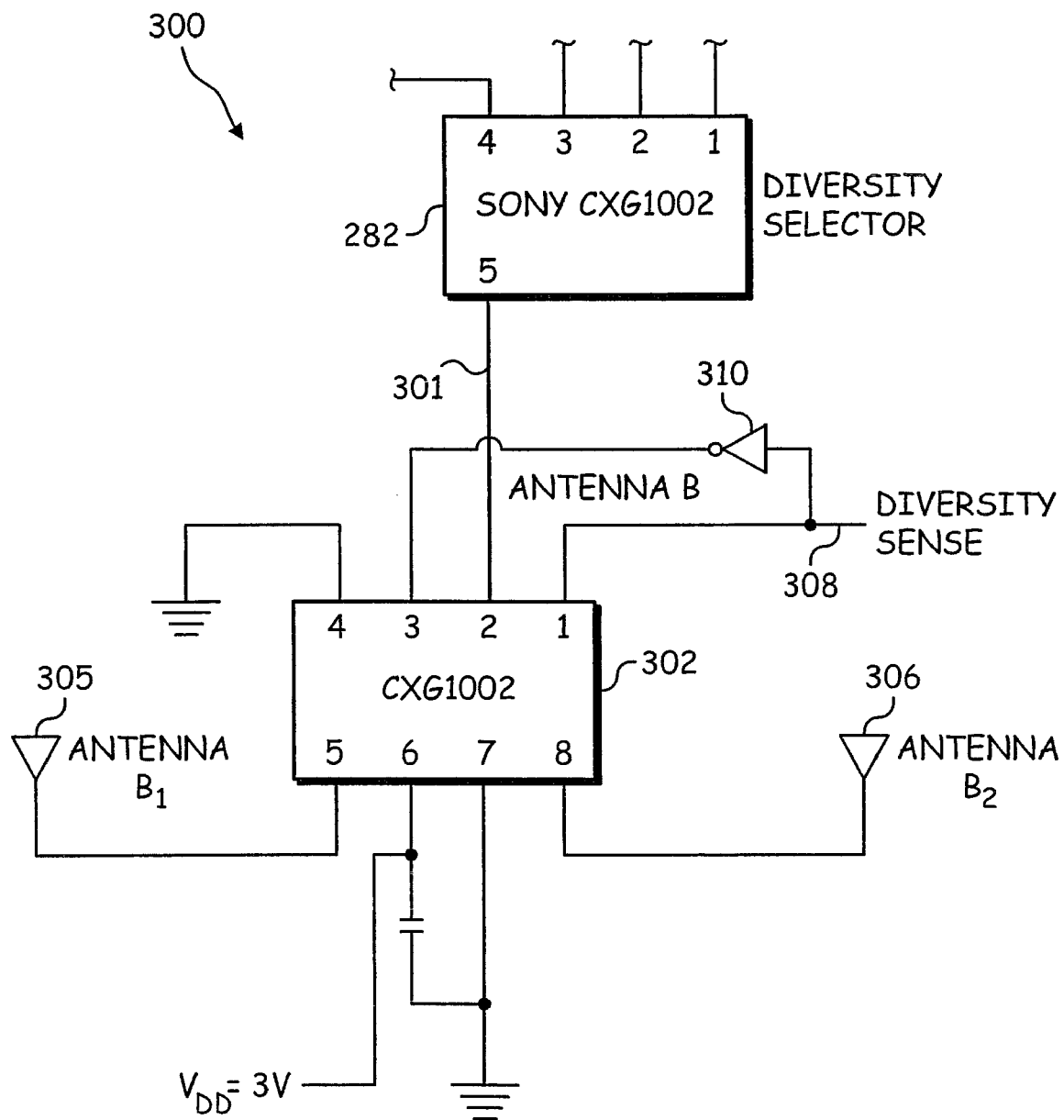
FIG. 30 is a circuit diagram showing an antenna diversity scheme which can be incorporated into the switching matrix circuit of FIG. 29.

Referring now to FIG. 30, a second circuit (300) illustrating how the diversity select circuit is implemented is shown. The B antenna output (301) from the band selector is applied to a second CXG1002 switch (320). Two antennas (305 and 306) appropriate for 2.4 GHz are designed into the computer device. These antennas (305 and 306) provide either spatial or polarization diversity, or a combination of the two.

Selection of the antenna used is controlled by the radio card. The diversity sense line (308) is used to control the CXG1002 switch (302). The invertor (310) provides buffering and allow a single signal output from the radio card to be used for antenna selection. Alternatively, the diversity sense could be provided to the control microprocessor which could then in turn control the selection of antennas.

Selection diversity could be employed in both the A and B antenna paths if desired with the addition of a CXG1002 switch in the A path. This switch could be controlled by the same circuitry as the B switch, eliminating the need for separate control circuitry for the A path.

Referring again to FIG. 13, in another embodiment, the control microprocessor (98) is located within the radio card (85). In this configuration, the control microprocessor (98) selects the appropriate antenna by controlling the switching matrix (90) via the antenna interface (88). Thus, the control microprocessor (98) either has preset knowledge of the switching matrix and antenna availability, or may interrogate the microprocessor within the receiving unit for such detail.

In addition, in alternate embodiments, the radio card itself contains an antenna (not shown). In most configurations of this embodiment, if no alternate antenna is found within the receiving device, the radio card uses its own antenna. In such configurations, the radio card uses its own antenna as a backup, preferring to use of the receiving device's antennas if available. In other configurations, the radio card may choose the most effective antenna, which may either be its own or the receiving device's antenna. Such a choice may either be predetermined or made based on actual use, i.e., based on received signal strength indications (RSSI) or other signal or communication quality assessments. For example, referring to FIG. 12, a local antenna is housed within the radio card (64). Thus, if the radio card (64) cannot detect receiving device antennas, the radio card (64) chooses its own locally contained antenna. Referring to FIG. 13, in another exemplary configuration, the radio card (85) also contains its own internal antenna. The control microprocessor (98) not only chooses from among antennas stored within the receiving device, but also considers the antenna stored in the radio card (85). Note that, in addition to any antennas placed in the receiving device, the radio card might also be configured with a plurality of antennas.

Figure 14:
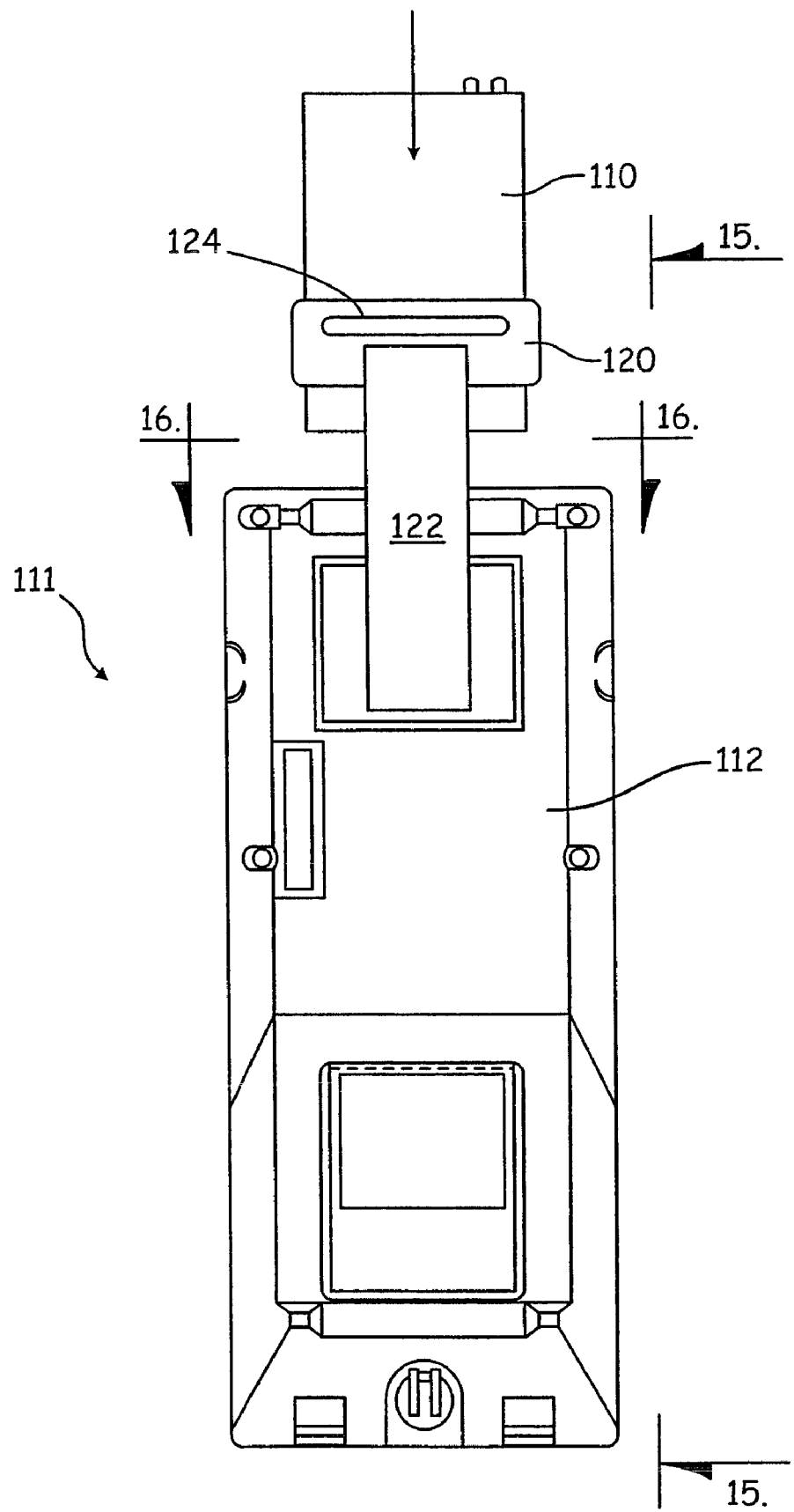
FIG. 14 is a back view of a computer device and radio card built in accordance with the present invention.
Figure 15:
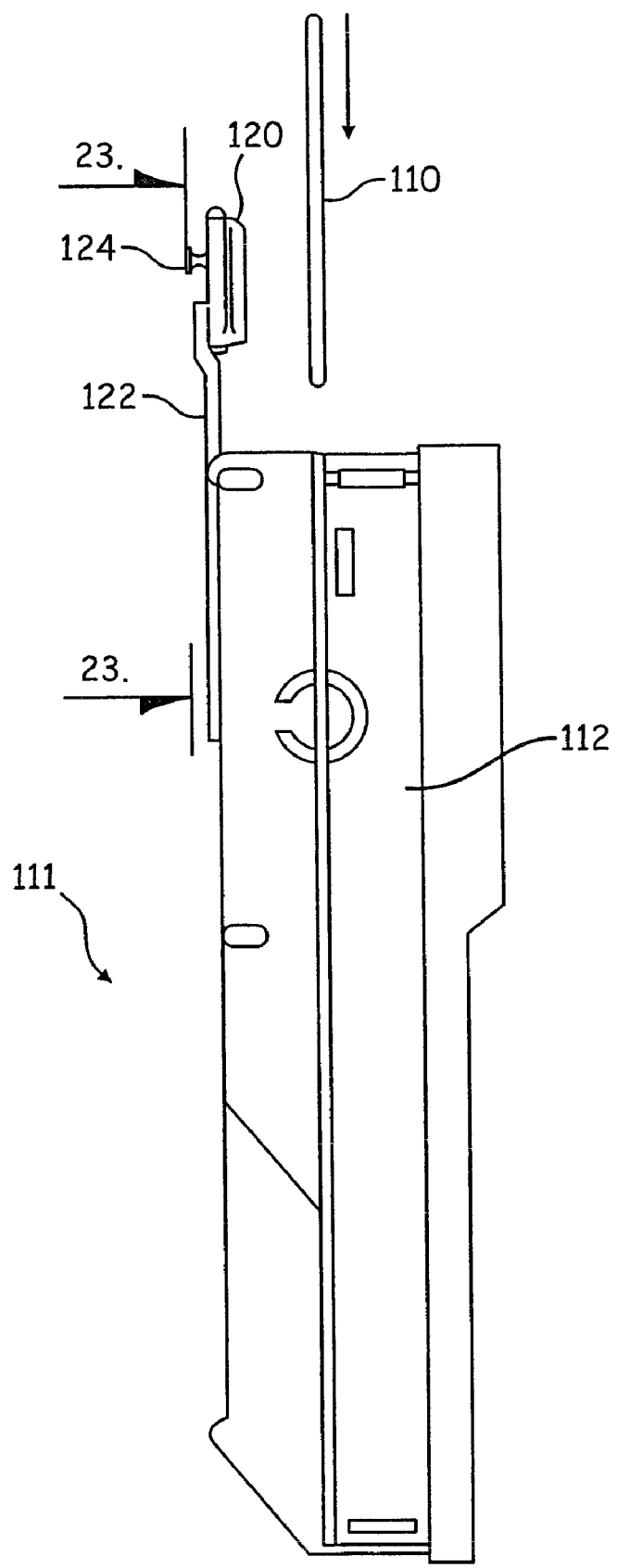
FIG. 15 is a side elevational view taken along line 15-15 of FIG. 14 of the computer device and radio card.
Figure 16:
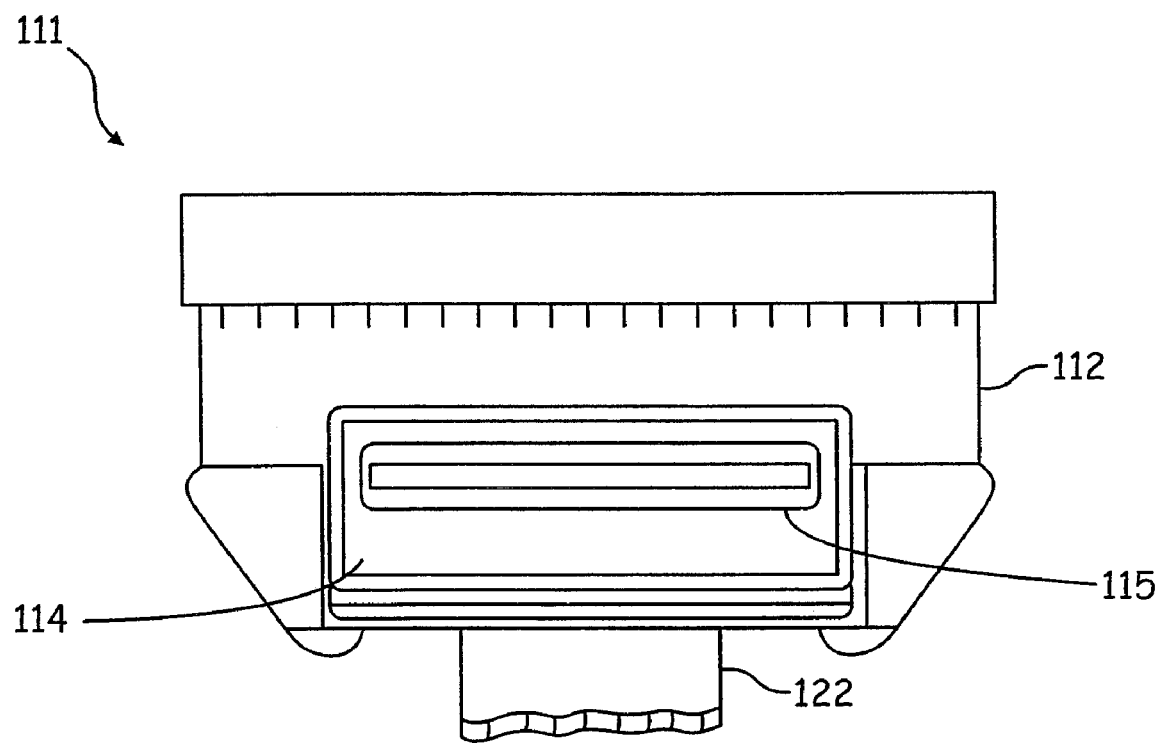
FIG. 16 is a partial top view taken along line 16-16 of FIG. 14 of the computer device.

Referring now to FIGS. 14, 15 and 16, a computer device (111) for utilizing a radio card (110) built in accordance with the present invention is shown. The computer device (111) has a housing (112). Inside the radio card (110) is a completely operation radio transceiver (not shown). The computer device (111) has an opening (114) in the housing (112) through which the radio card (110) can be inserted into the computer device (112). In the present embodiment of the invention, the receiving means for the computer device is a slot (115).

When the radio card (110) is inserted into the slot (115) in the computer device (111) an interface between the radio card (110) and the computer device (111) is produced. The computer device (111) has a plurality of pins (not shown) which form the plug or male portion of a connector. The radio card (110) has a corresponding plurality of sockets or holes (not shown) which form the receptacle or female portion of the connector and which engage the pins. The pins are connected internally and electrically to the computer device (111) by a series of electrical connections such as wires, printed circuit traces or electrical ribbon. The holes in the radio card (110) are electrically connected to the radio transceiver. When the pins engage the holes, electrical signals can be exchanged between the radio transceiver inside the radio card (110) and the computer device (111). The electrical signals can be in the form of information exchange, power supply or both. The radio card (110) includes antenna contacts (117) to engage corresponding radio antenna contacts that are connected to an appropriate antenna.

The computer device (111) includes a cap (120) which is designed to matingly engage the opening (115) in the housing (112) of the computer device (111) and thereby cover the slot (115) used to receive the radio card (110). A flexible band (122) attaches the cap (122) to the housing (112) of the computer device (111). One end of the band (122) is connected to the cap (122) while the other end is attached to the housing (112). A handle (124) helps assist the removal of the cap (120) from the housing (112) of the computer device (111).

The cap (120) is constructed of a closed cell foam material with high air content for low dielectric losses. Alternatively, a quality dielectric material may be used to reduce the size of the antenna structure. The cap (120) when made of a foam material helps to protect the radio card from the physical trauma typically associated with computer devices of these types. Additionally, as will be discussed in further detail below, the cap (120) helps to environmentally seal the opening (114) preventing harmful material from the outside such as dust or moisture from reaching the radio card (110) and helps to reduce the escape of electronic noise from the housing (112) created by the radio card (110) and computer device (111). As will be discussed below, a grounded metal shield covering a portion of the cap (120) is used to reduce the escape of electronic noise.

While the cap (120) helps to seal the opening, protect the radio card (110) and hold the radio card in place, the primary function of the cap is to provide the radio card (110) access to an appropriate antenna or antennas. The connection of the radio card (110) to the antenna is made through the cap (120). The antenna or antennas can be embedded in the cap (120), embedded in the band (122) or even attached to, mounted on, or embedded in the housing (112) of the computer device (111).

Figure 17:
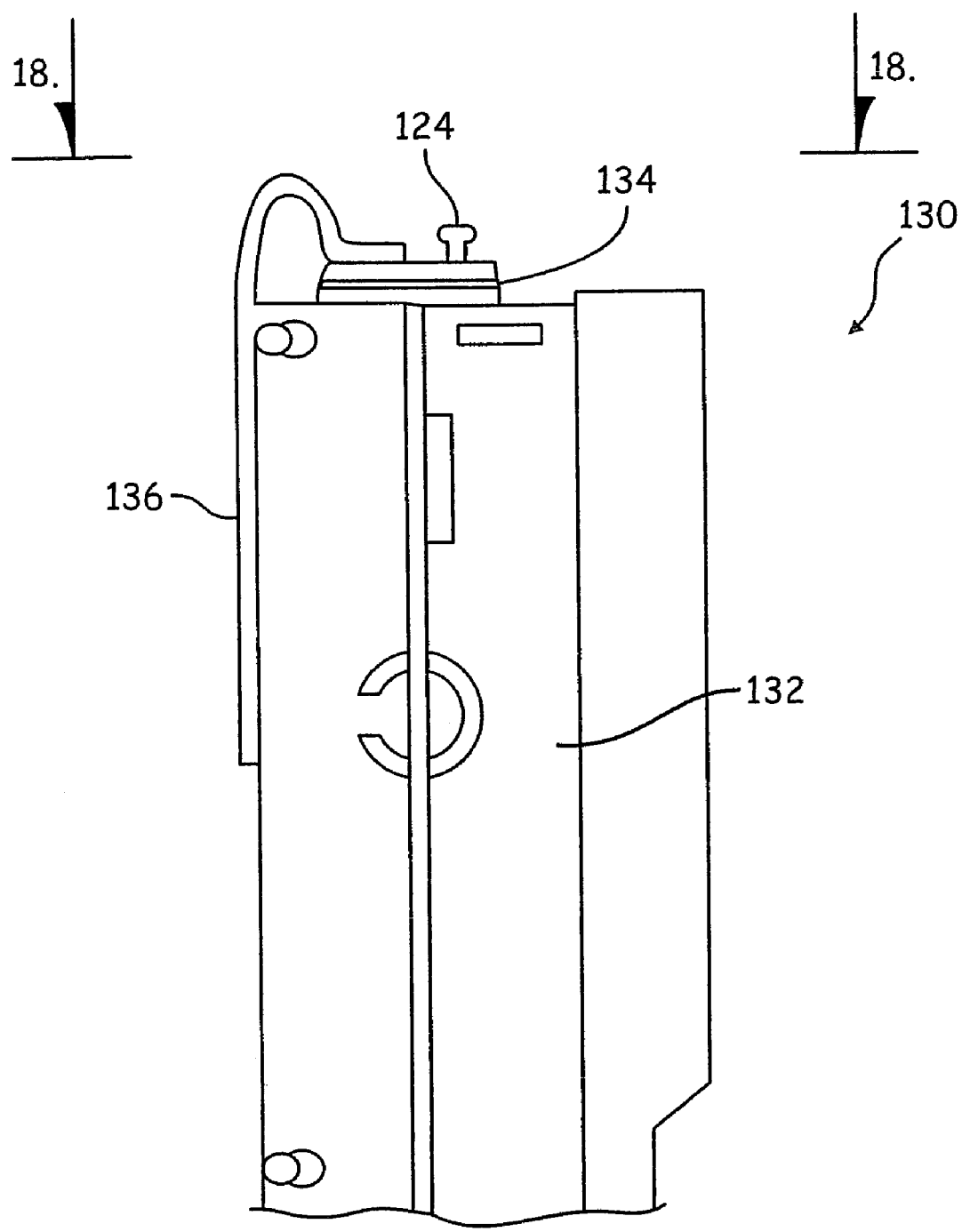
FIG. 17 is a partial side elevational view of another computer device built in accordance with the present invention.
Figure 18:
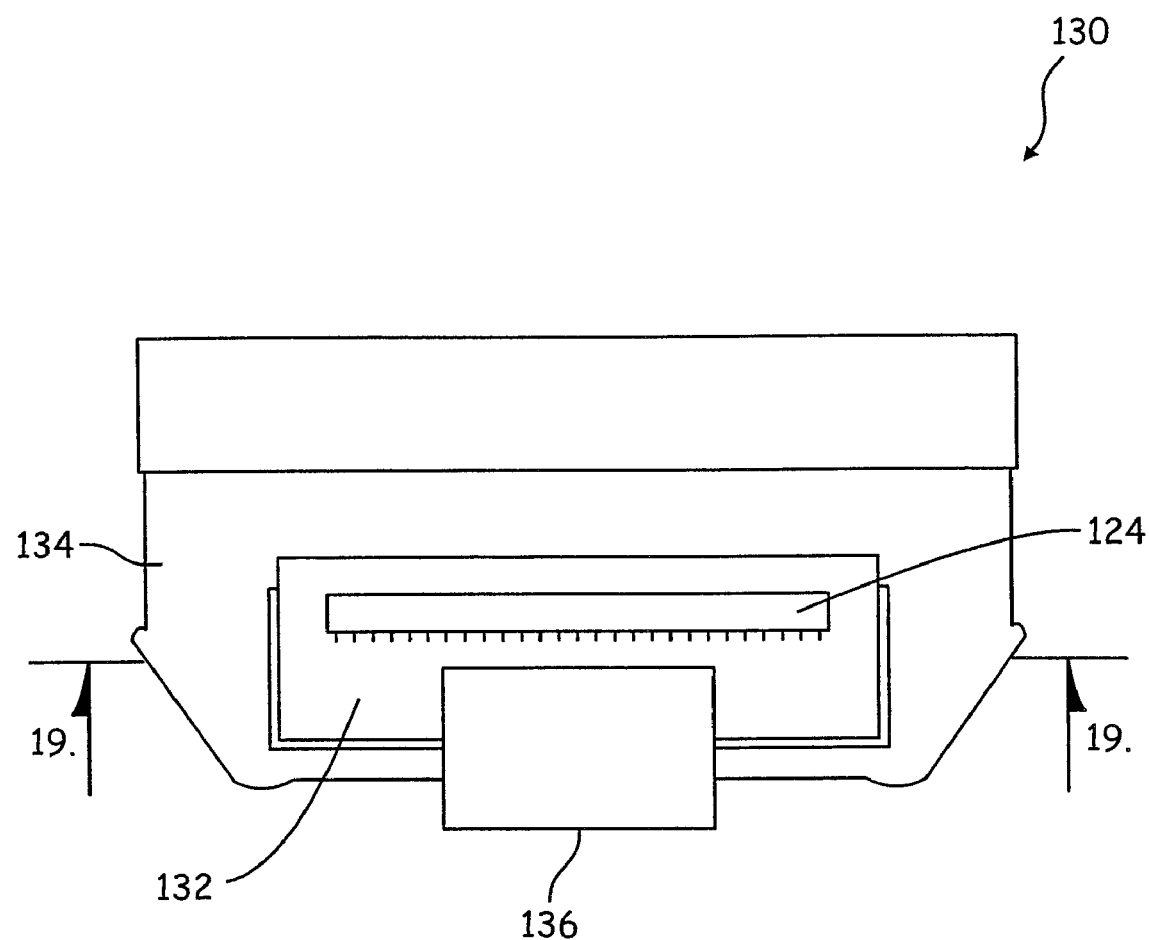
FIG. 18 is a top view taken along line 18-18 of FIG. 17 of the computer device showing the rubber cap inserted therein.

Referring now to FIGS. 17 and 18, a computer device (130) built in accordance with the present invention is shown with a cap (134) engaged in the opening of the housing (132) wherein a radio card can be inserted. A band (136) is attached to both the cap (134) and the housing (132). The band (136)

helps prevent the loss of the cap (134) when the cap (134) is not engaged in the housing (132) of the computer device (130).

Figure 19:
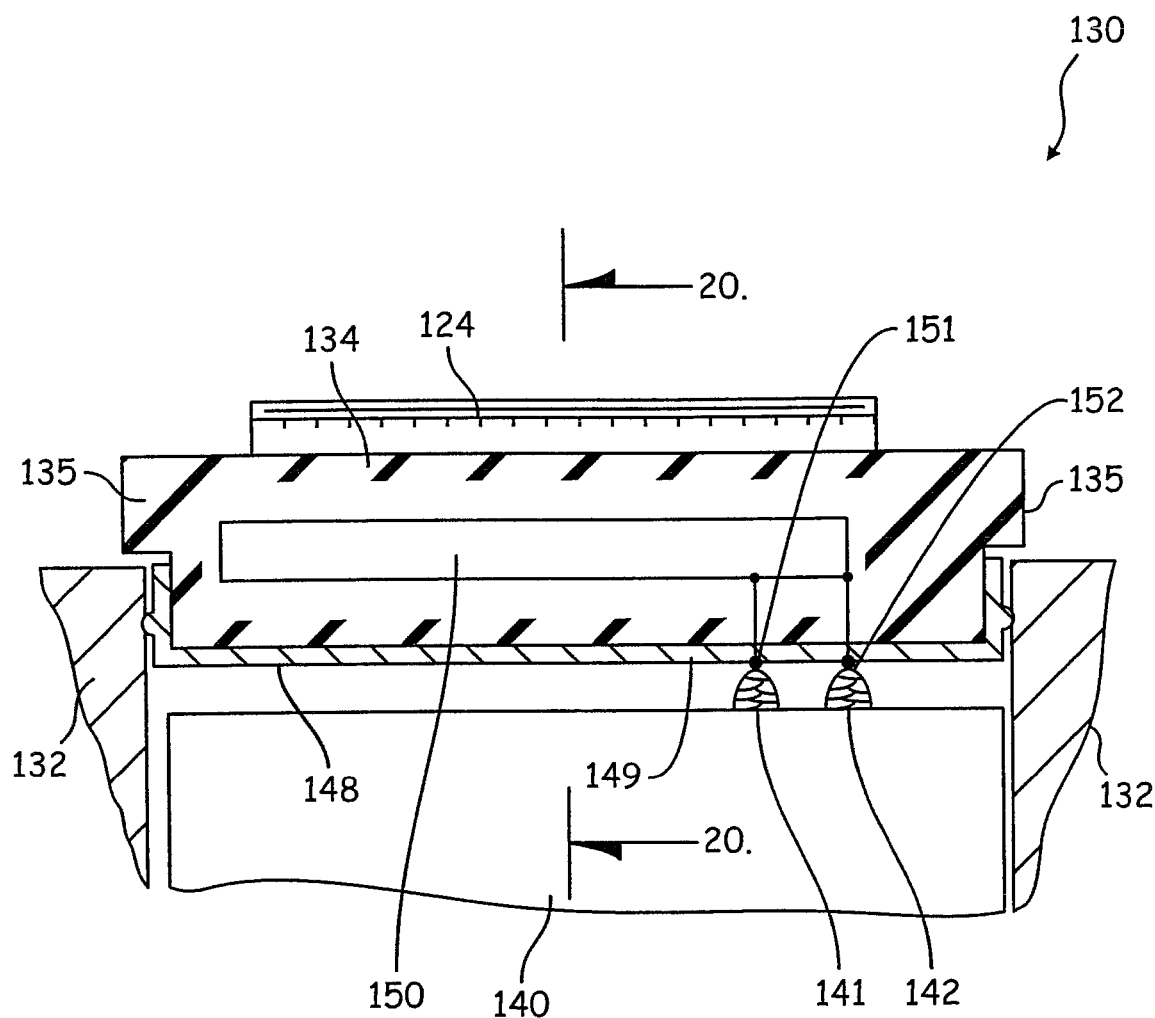
FIG. 19 is a partial vertical sectional view taken along line 19-19 of FIG. 18 showing a radio antenna embedded within the rubber cap.
Figure 20:
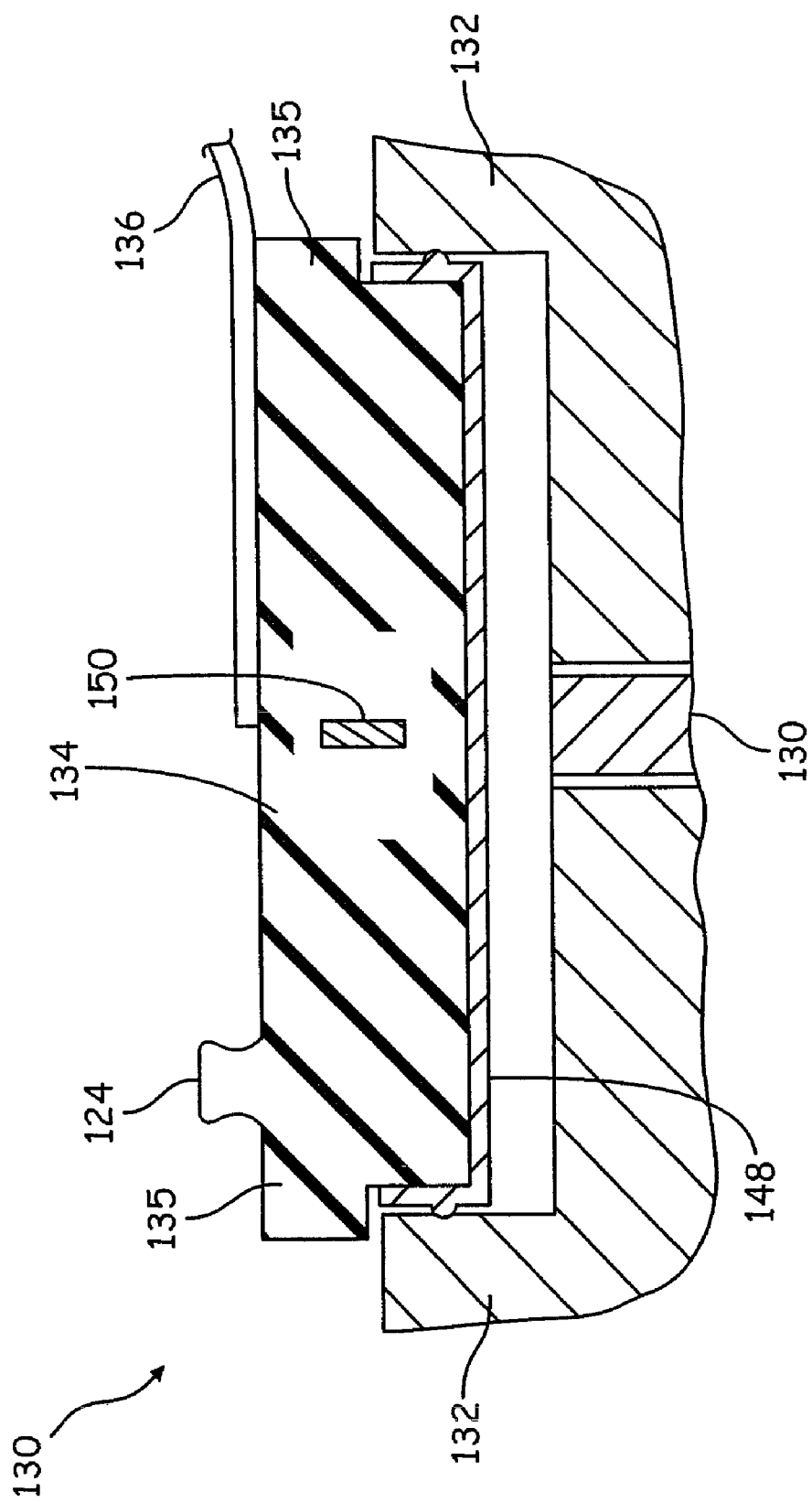
FIG. 20 is a partial vertical section view taken along line 20-20 of FIG. 19 of the rubber cap.

Referring now to FIGS. 19 and 20, the cap (132) is shown engaged with the housing (132) of the computer device (130). The cap (134) includes an outwardly extending lip (136) which helps to environmentally seal the opening in the housing (132) preventing harmful material from the outside such as dust or moisture from reaching the radio card (140) which has been inserted into the computer device (130). When the cap (134) is completely inserted or fully engaged in the housing (132), the lip (135) sealingly engages the housing (132).

Embedded in the cap (134) is an antenna (150). The antenna (150) is connected to the radio card (140) through contacts (151 and 152) disposed on the cap (134) and contacts (141 and 142) disposed on the radio card (140). Contact (152) is the ground contact for the antenna (150) and is connected to the end of the antenna (150). Contact (142) is the ground contact for the radio card (140). Contact (151) is the signal contact and is connected to the antenna (150) a short distance from the end of the antenna (150). Contact (141) is the signal contact for the radio card (140).

Contact (151) and contact (141) are disposed on the cap (134) and the radio card (140), respectively, such that the contacts engage each other when the cap (134) is inserted into or engaged with the housing (132) of the computer device (130). Similarly, contact (152) and contact (142) are disposed on the cap (134) and the radio card (140), respectively, such that the contacts engage each other when the cap (134) is inserted into or engaged with the housing (132) of the computer device (130). The contacts shown in the present embodiment are of the metal button type wherein the connection is made when the two metal surfaces meet. Many variations of the contacts are possible including the use of male/female connections and spring type contacts.

A shield (148) is disposed around the bottom portion of the cap (134) and is used to reduce the escape of electronic noise. Typically in computer devices of this type, the inside of the housing of the computer device is shielded. Additionally, the area immediately surrounding the radio device such as a radio card may also be shielded. By shielding the cap (134), the integrity of the housing and radio shields are not breached by the opening used to insert and remove the radio card. The shield (148) is connected to the antenna ground contact (152) on the cap (134). A hole (159) in the shield (148) allows the signal contacts (151 and 141) to engage without being grounded.

Figure 21:
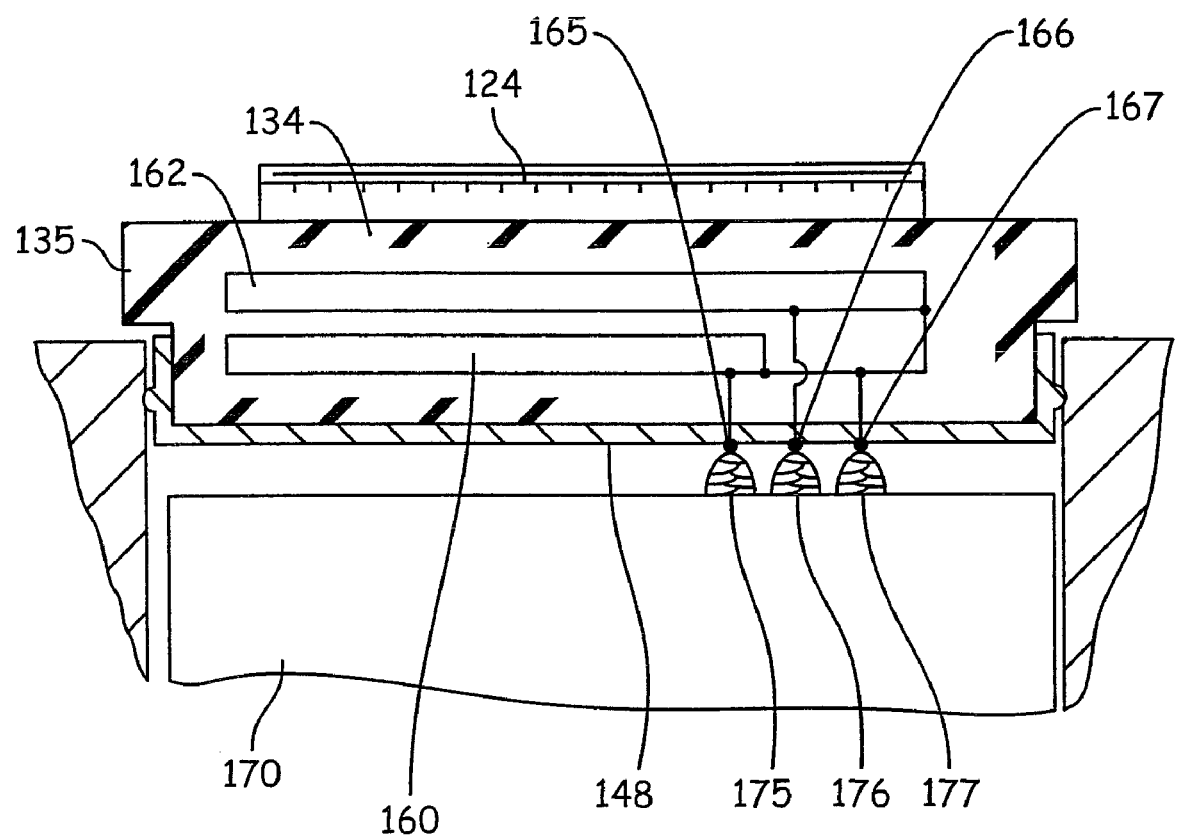
FIG. 21 is a partial vertical sectional view of another embodiment of the present invention.

Referring now to FIG. 21, the cap (134) is shown embedded within which are two antennas (160 and 162) designed to receive and transmit different radio frequency signals. The first antenna (160) and the second antenna (162) are both connected to a common ground contact (167) which is connected to the shield and which engages the ground contact (177) on the radio card (170). The first antenna (160) is connected to a first signal contact (165) and is disposed on the cap (134) to engage a first signal contact (175) disposed on the radio card (170). Similarly, the second antenna (162) is connected to a second signal contact (166) and is disposed on the cap (134) to engage a second signal contact (176) disposed on the radio card (170). Thus the radio card (170) will use a signal via contact (175) or via contact (176) depending upon which antenna it would like to use. Which antenna it would like to use is dependent upon the desired frequency upon which it want to transmit and receive.

The radio card (170) as shown has three contacts (175, 176 and 177). However, if the radio transceiver in the radio card (170) is designed such that it would only be able to transmit and receive signals which correspond to the first antenna (160), then it would not need to have contact (176) and it could be left off. Similarly, if the radio card (170) were only going to use second antenna (162) then contact (175) could be omitted. Thus, standardizing contact position with respect to antenna type allows for flexibility in cap usage with various radio cards such that only appropriate antennas will be connected to the radio card.

Figure 22:
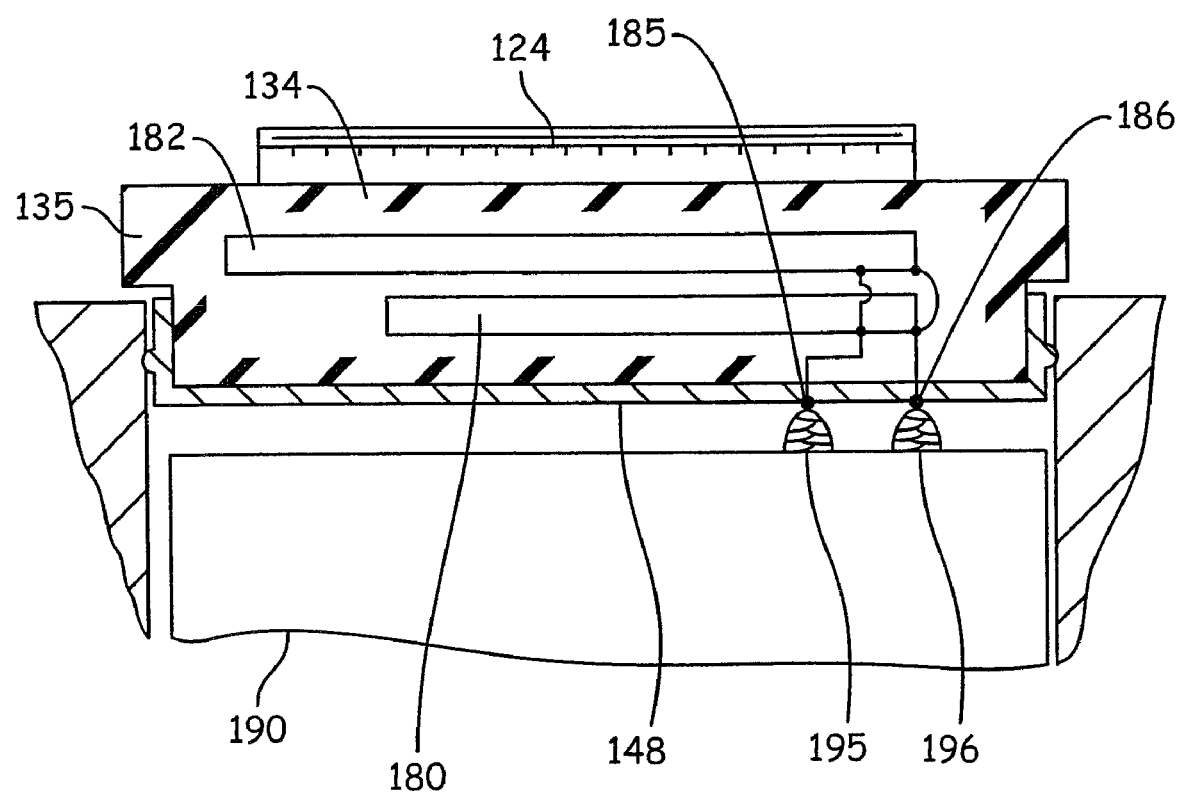
FIG. 22 is a partial vertical sectional view of still another embodiment of the present invention.

Referring to FIG. 22, two antennas (180 and 182) are embedded in the cap (134). In this embodiment built in accordance with the present invention, the two antennas (180 and 182) not only share a common ground contact (186) which engages the ground contact (196) of the radio card (190), but they also share a common signal contact (185) which engages the signal contact (195) on the radio card (190). Thus, both antennas receive and transmit signals using the same two contacts. This embodiment requires a radio card (190) which can filter the different signals and thus use the signal from the desired antenna while ignoring the signals which arrive via the other antenna.

Figure 23:
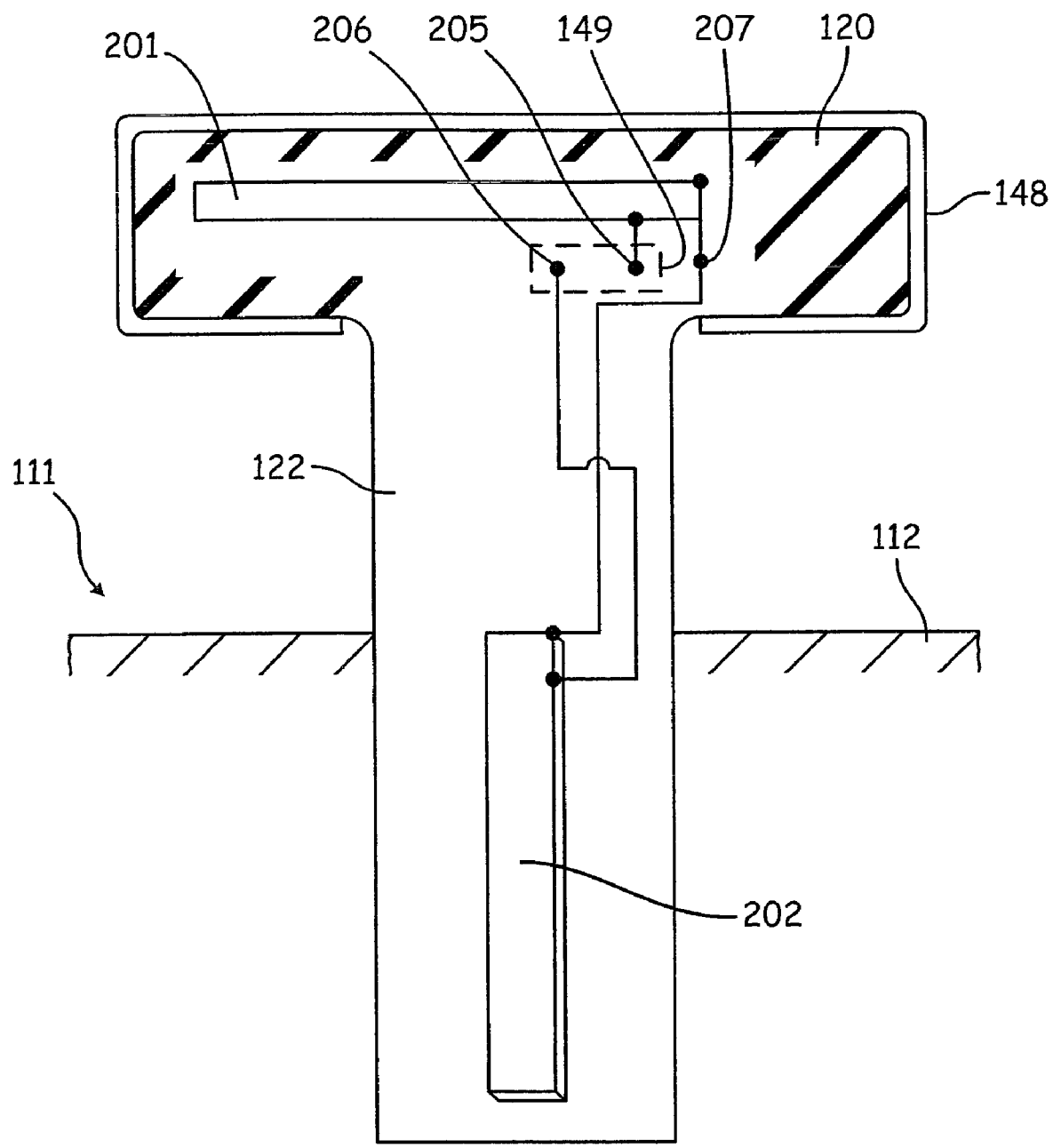
FIG. 23 is a partial back view taken along line 23-23 of FIG. 15 of the computer device.

Referring to FIG. 23, a computer device (111) built in accordance with the present invention is shown which is designed to implement an antenna diversity scheme. A first antenna (201) is embedded in the cap (120). A second antenna (202) is shown embedded in the band (122). As discussed in the embodiment as shown in FIG. 21, the two antennas (201 and 202) share a common ground contact (207). The first antenna (201) is connected to a signal contact (205). Likewise, the second antenna (202) is connected to a signal contact (206). The hole (149) in the shield (148) which prevent the signal contacts (205 and 206) from grounding is shown in dashed lines.

The first antenna (201) is similar to the second antenna (202) and both are designed to transmit and receive similar radio frequency signals. When the cap (120) is engaged in the opening of the housing (112), the first antenna (201) and the second antenna (202) will be perpendicular with respect to each other. The quality of the signal received by the first antenna (201) and the quality of the signal received by the second antenna (202) may be greatly different since the antennas are place at right angles with respect to each other. In the present embodiment, the radio card can check the quality of each signal and use the antenna which is currently receiving the stronger signal. Additionally, it can switch to the other antenna when the conditions change such that the signal is no longer acceptable. Utilizing two similar antennas in this matter, antenna diversification, can be very important in computer terminals of this type since they are often mobile and are often subjected to a rapidly changing environment. An antenna diversification scheme of this type can be used to help eliminate the reception problems associated with signal multipath.

Figure 24:
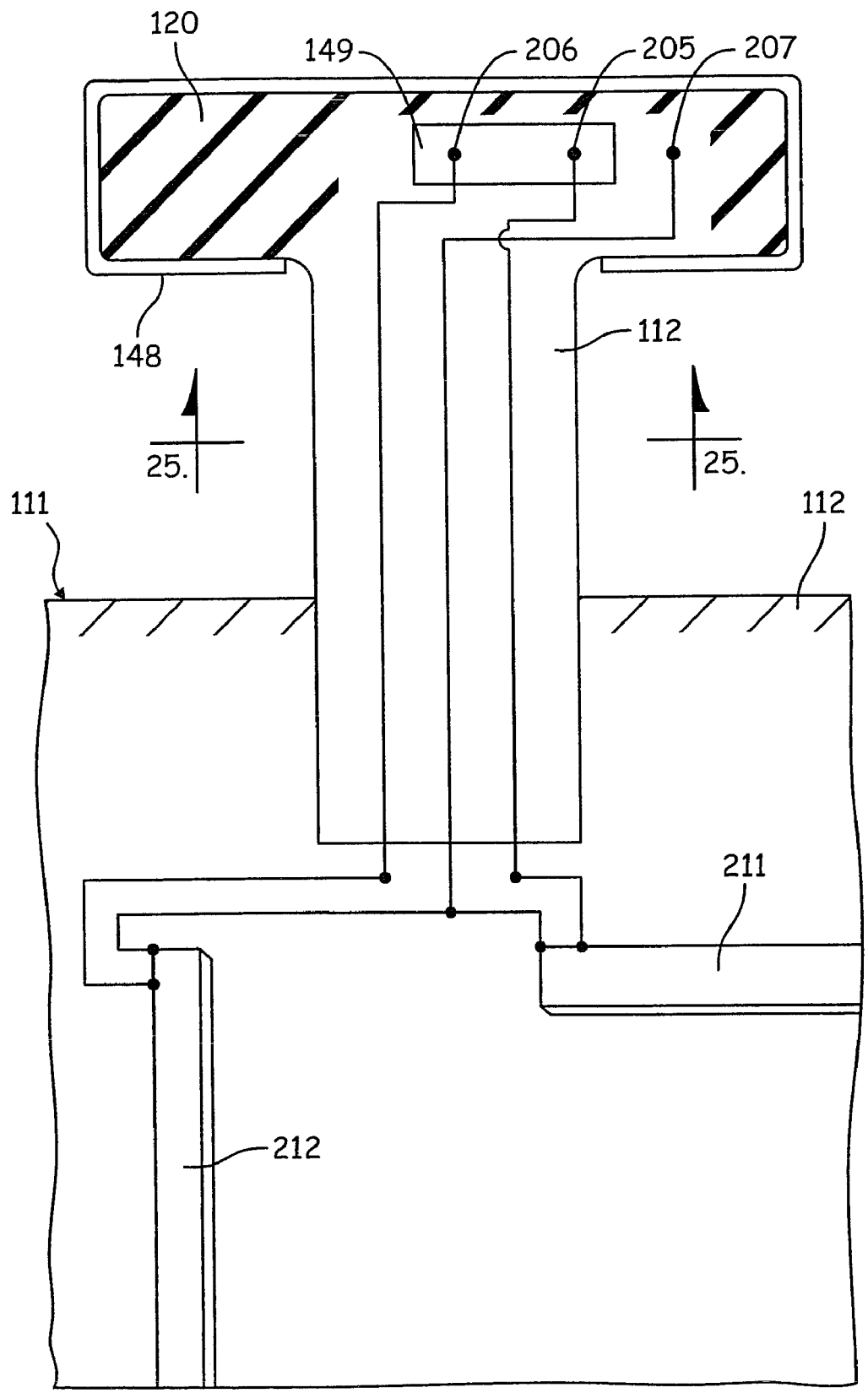
FIG. 24 is a partial back view of still another embodiment built in accordance with the present invention.

Referring now to FIG. 24, another embodiment of the present invention is shown with the first antenna (211) and the second antenna (212) attached to the housing (112) of the computer terminal (111). As in the embodiment shown in FIG. 23, the first antenna (211) is similar to the second antenna (212) and both are designed to transmit and receive similar radio frequency signals and are perpendicular with respect to each other such that an antenna diversity scheme can be implemented. The antennas (211 and 212) are connected to the contacts (205, 206 and 207) through the cap (120) and though the band (112).

Figure 26:
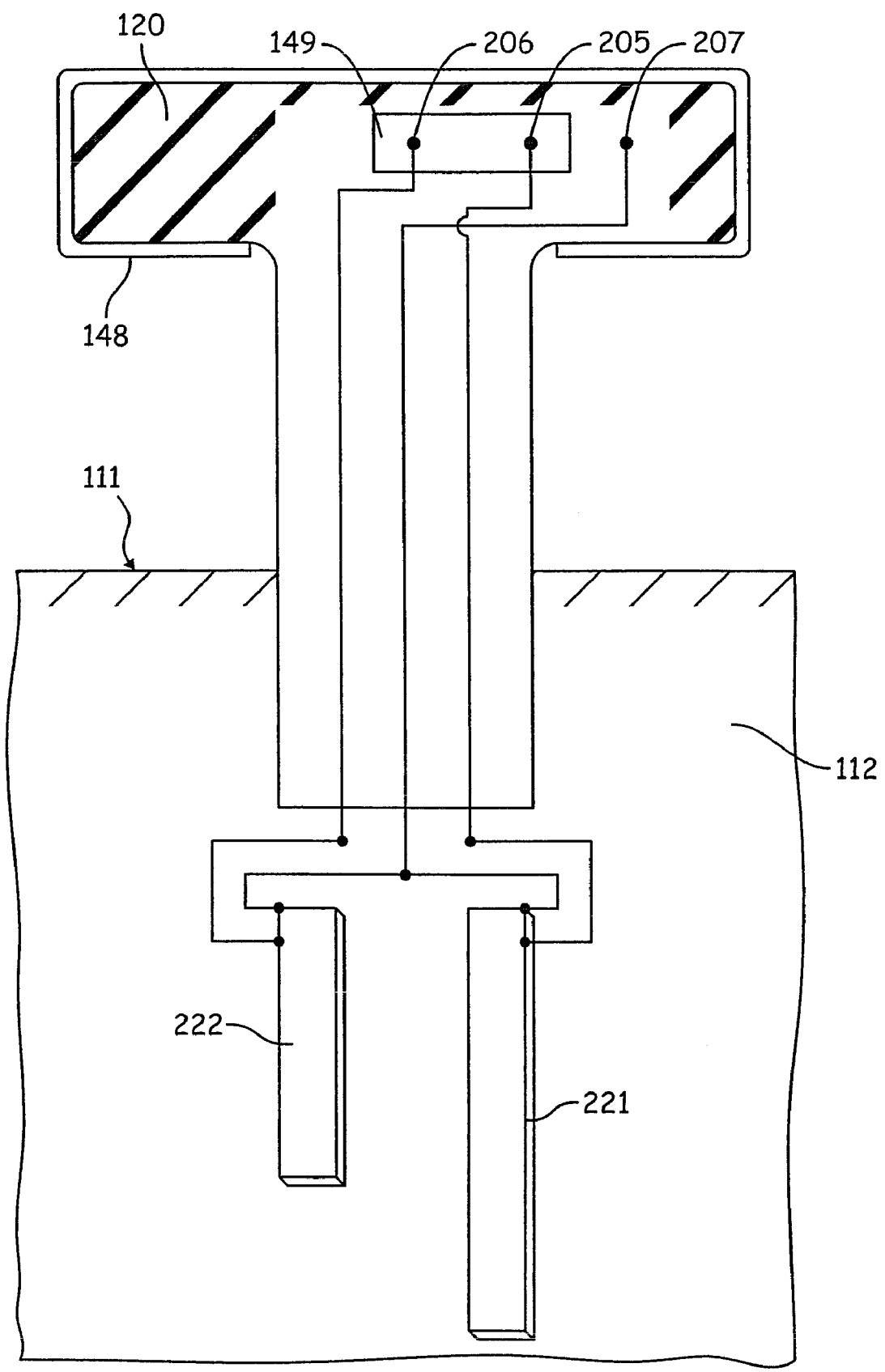
FIG. 26 is partial back view of a computer device of yet another embodiment of the present invention.

Referring to FIG. 26, the embodiment of FIG. 24 is shown with the only differences being that the first antenna (221) and the second antenna (222) are positioned slightly differently and the antennas are designed to transmit and receive different radio frequency signals. Thus, the radio card uses the signal on contact (205) when it wants to receive signals via the first antenna (221) and uses the signal on contact (206) when it wants to receive signal via the second antenna (222).

Figure 25:
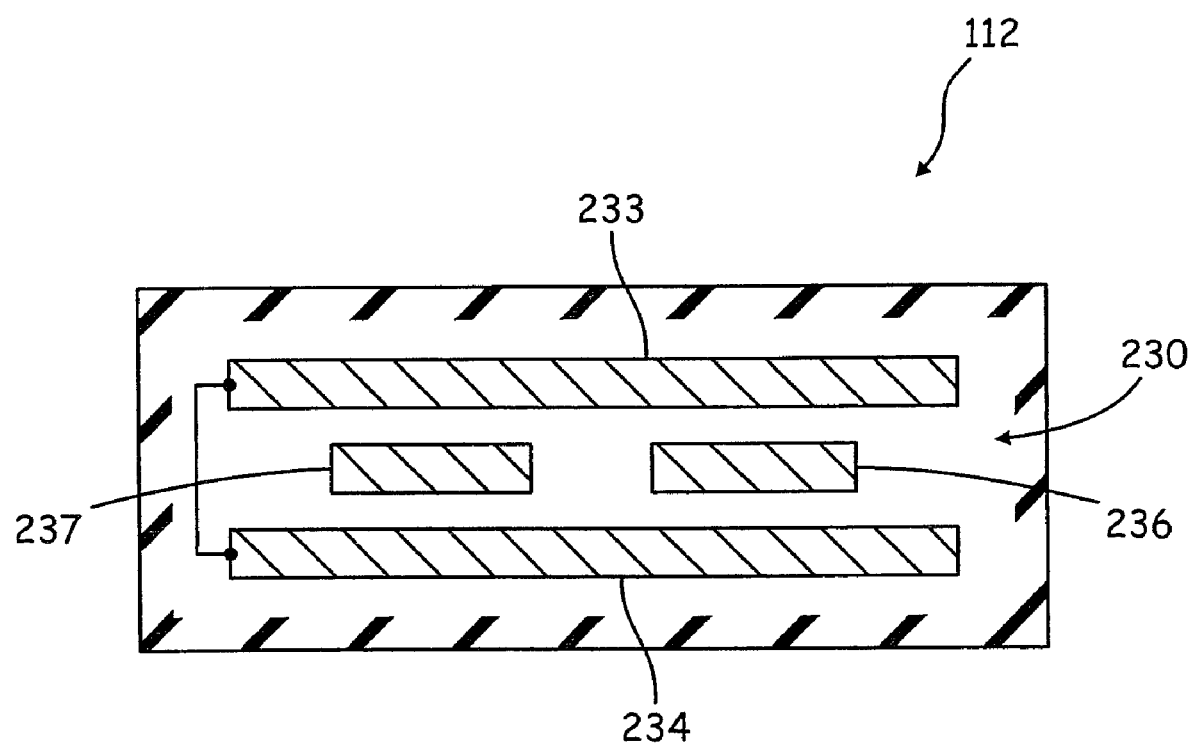
FIG. 25 is a partial horizontal sectional view taken along line 25-25 of FIG. 24 of the band showing the shielded ribbon used to carry the antenna signals.

In FIGS. 23, 24 and 26, the portion of the connection between the contacts (205, 206 and 207) and the antennas which pass through the band (112) are shown schematically as wires. In the best mode of the present invention, the transmission of the signal through the band (112) would be accomplished through the use of a micro shield strip (230) as shown in FIG. 25. The micro shield strip consists of several conductive ribbons running the length of the band (112) and separated by the non-conductive material of the band (112). A wide top ribbon (233) and a wide bottom ribbon (234) are used to sandwich two smaller ribbons (236 and 237). The smaller ribbons (236 and 237) are used to transmit the antenna signals and are connected to contacts (205 and 206) respectively. The wide bands (233 and 234) are common to each other and are used to ground each of the antennas and are connected to the ground contact (207) on the cap (120). The wide ground ribbons (233 and 234) shield the smaller antenna signal ribbons (236 and 237) and help to maintain the signal integrity. The impedance of the micro-shield strip is determined by relative spacing and dimensions of the strip as well as the dielectric constant of the material of the band.

Figure 27:
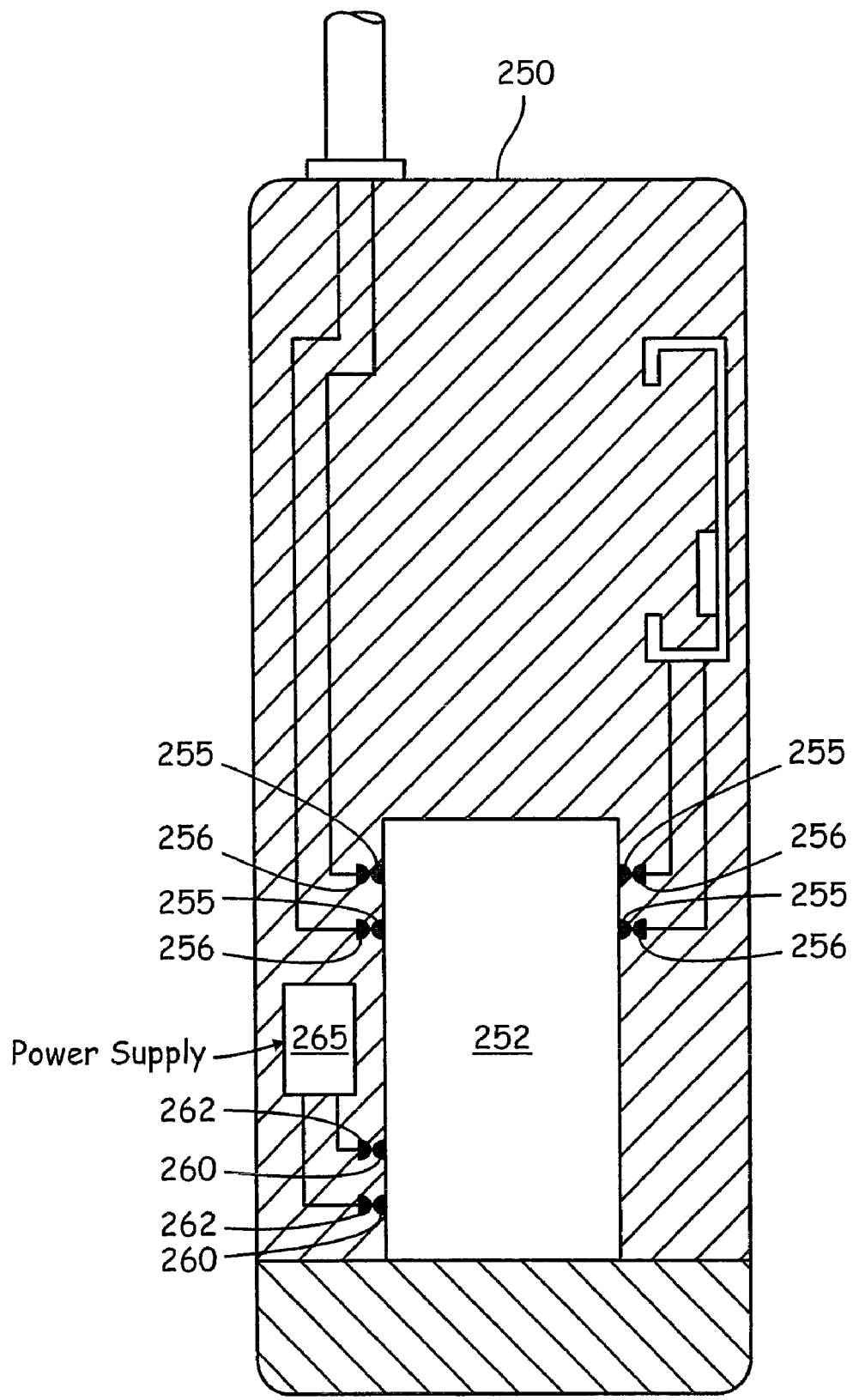
FIG. 27 is a partial top view of a computer device built in accordance with the present invention showing a pair of power contacts.

Referring now to FIG. 27, a radio card or modem card (252) is shown inserted into a computer device (250). In addition to antenna contacts or telephone line contacts (255) on the card (252) and corresponding antenna, modem or telephone contacts (256) disposed on the receiving portion of the computer device (250), there are a pair of power contacts (260) positioned on the housing of the card (252) which engage a corresponding pair of power contacts (262) disposed on the receiving portion of the computer device (250). The power contacts (262) are connected by wires to the power supply (265) for the computer device (250) and provides supplemental power to the radio, modem or cellular phone inside the card (252) which cannot be provided by the electrical interface.

Figure 28:
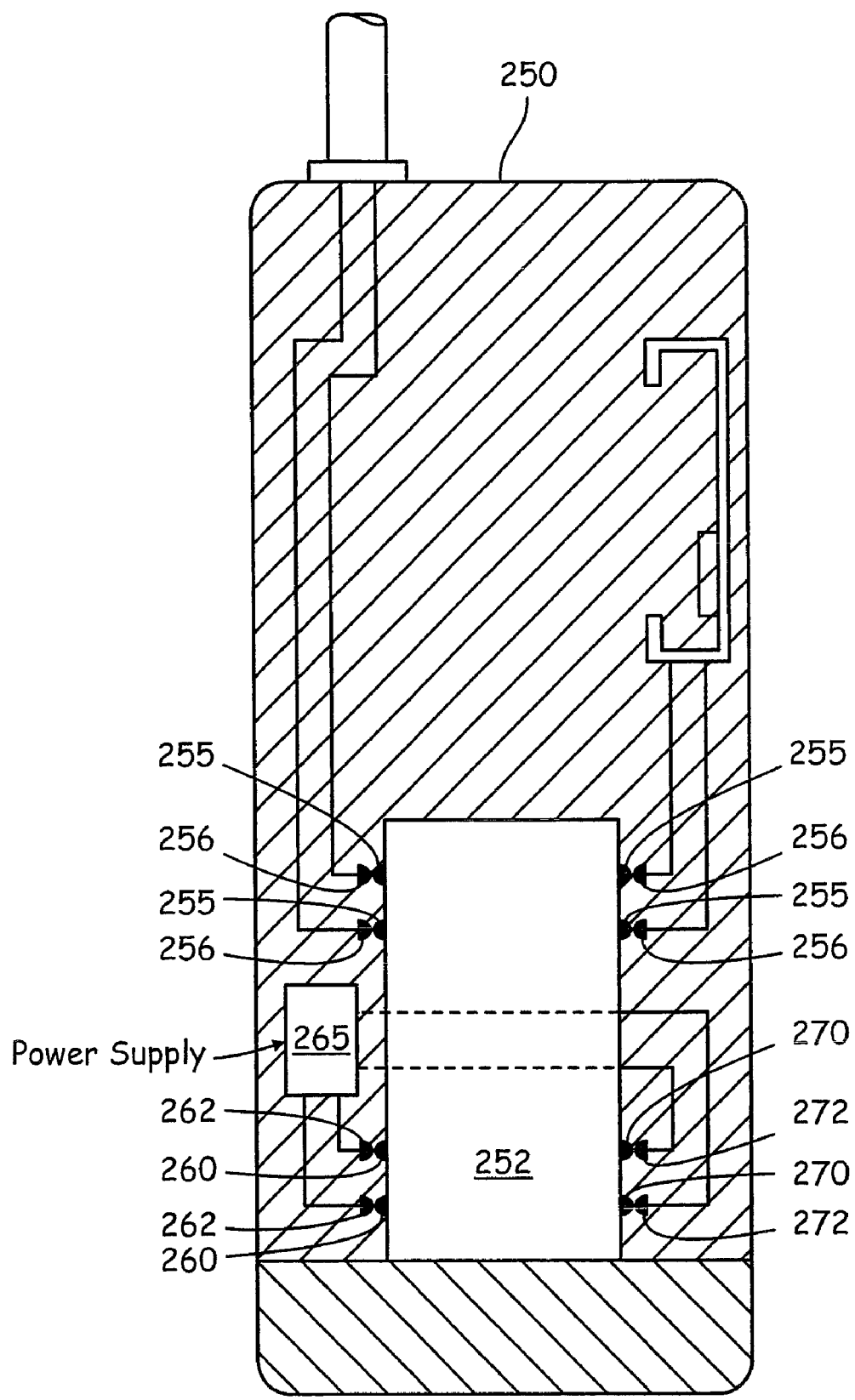
FIG. 28 is a partial top view of another computer device built in accordance with the present invention showing redundant power contacts.

Referring now to FIG. 28, the card (252) is shown with an additional pair of power contacts (270) positioned on the opposite side of the card (252) with respect to the first pair of power contacts (260). The additional pair of power contacts (270) engage a corresponding pair of power contacts (272). The power contacts (272) are also connected by wires to the power supply (265). The second pair of engaging contacts (270 & 272) provide power source redundancy and insures that the card (252) will be connected to the power supply (265) even if the card (252) shifts slightly from side to side in the receiving portion of the computer device (250). This redundancy of contacts positioned on opposite sides of the housing of a communication card could also be used to insure that the communication card is always in contact with an appropriate antenna or telephone.

Figure 31:
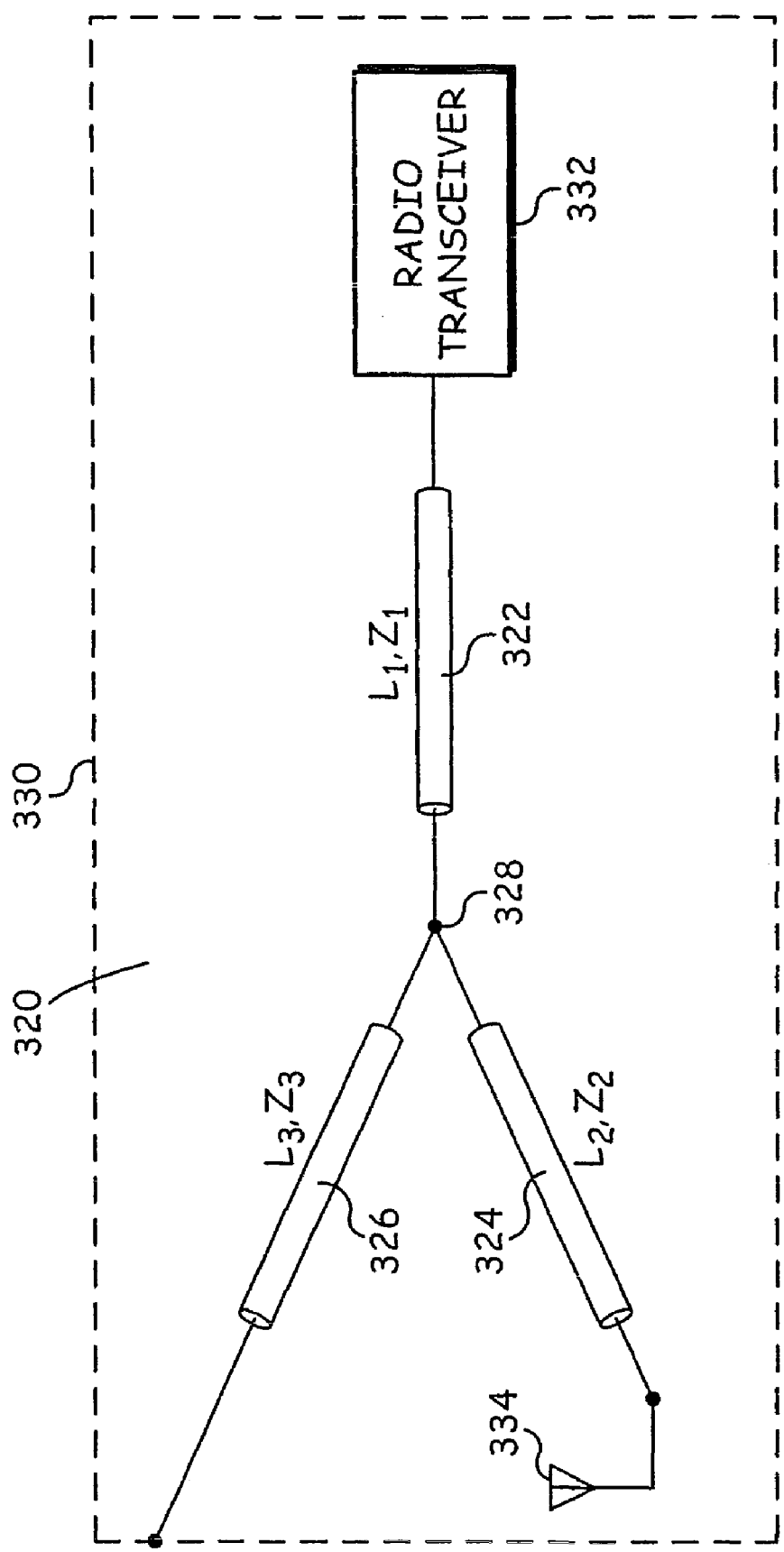
FIG. 31 is a schematic view of a transmission line antenna power switching system built in accordance with the present invention.

Referring now to FIG. 31, an antenna selection or switching system built in accordance with the present invention is shown. In this embodiment, the switch system (320) utilizes three transmission lines (322, 324 and 326). Each of the three transmission lines (322, 324 and 326) are commonly connected at one end (328). The end of each of the three transmission lines (322, 324 and 326) which are commonly connected are referred to the common end. The end of each transmission line opposite of the common end is referred to as the load end. The dash line (330) symbolically represents the housing of the radio communications device which utilizes the switch system (320).

The first transmission line (322) is connected to a radio transceiver (322) at the load end. The second transmission line is connected to an internal antenna (334) at the load end. The third transmission line (326) is not connected to anything at the load end. The load end of the third transmission line is where an optional external antenna may be attached. The internal antenna (334) will typically be a low-gain antenna and will typically have a rated resistance of 50 ohms.

Each of the transmission lines (322, 324 and 326) have transmission characteristic. The characteristics significantly relevant to the present invention are the line impedance and the line length. The line impedance is measured in ohms. The line length is measured in electrical degrees at a given frequency.

Figure 32:
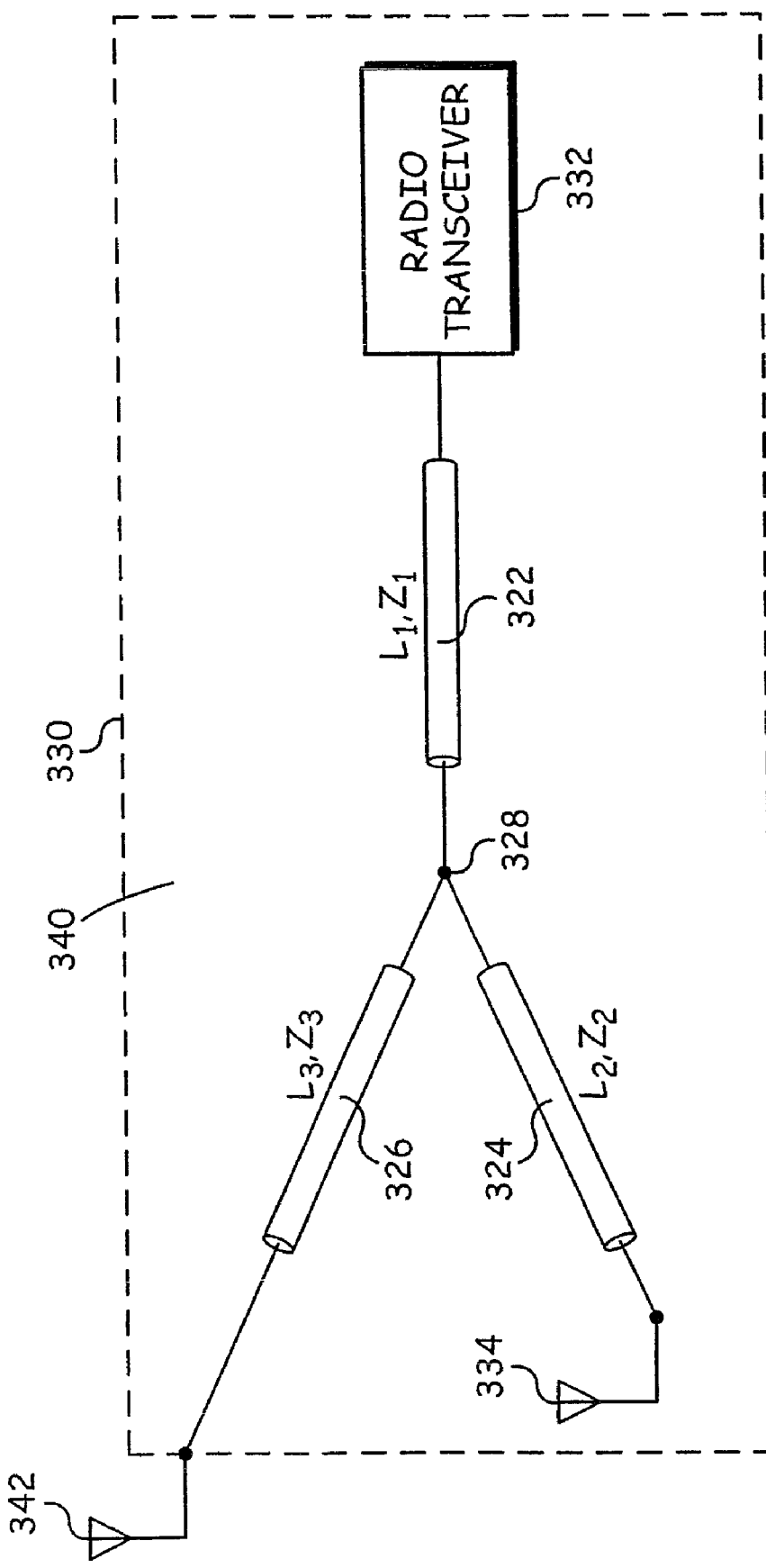
FIG. 32 is a schematic view of the transmission line system of FIG. 31 showing an attached external antenna.

Referring now to FIG. 32, a similar system (340) to the system (320) of FIG. 31 is shown with the difference that the system (340) of FIG. 32 includes an external antenna (342) connected to the load end of transmission line (326). The external antenna (342) is typically a high gain antenna is also typically rated at an impedance of 50 ohms.

In utilizing the selection or switch system shown in FIGS. 31 and 32, consideration must be given to the radio frequency or frequency range which will be utilized by the radio transceiver (332) for communication. Also the characteristics of the internal and external antennas are considered.

The system also includes system characteristics which result from consideration of the individual components of the systems. The important characteristics for the present invention include the VSWR (voltage standing-wave ratio) looking into the load end of the first transmission line (322) and the power distribution ratio between the second transmission line (324) and the third transmission line (326). The goal of the system is to have as much power as possible transmitted to the second transmission line (324), and thus to the internal antenna (334), when there is no external antenna attached. Conversely, when there is an external antenna (342) attached, the goal is to have as much power as possible transmitted to the third transmission line (326), and thus transmitted to the external antenna (342).

By carefully selecting the transmission lines (322, 324 and 326) for specific impedance and length characteristics, desired VSWR and power distribution ratios can be achieved. When appropriate transmission lines (322, 324 and 326) are selected, the system automatically changes from one desired configuration to another desired configuration when an external antenna is connected. In other words, when there is no external antenna connected, the transmission power is primarily sent to the internal antenna. When the external antenna is connected, the system characteristics change such that the external antenna is now receiving a significant amount of power.

The amount of power which is transmitted to the external antenna (342) when connected need not greatly exceed the power transmitted to the internal antenna (334). In fact, the system could achieve significant improvement in performance even if the percentage of the power transmitted to the external antenna (342) is fifty percent or less. This improvement results from the practical consideration that the internal antenna (334) typically will have different gain characteristics on the frequency or range of frequency used for communication. Thus, if the external antenna (342) has a gain sufficiently greater than the internal antenna (334), the external antenna (342) will provide for better performance even if it only receives half of the transmitted power. For example, it is desirable that the system of the present invention behave in a manner similar to a 6 dB unequal power splitter. That is to say that at least 75% of the power will be transmitted to the external antenna (342) while no more than 25% of the power is transmitted to the internal antenna (334). However, this 75/25 split may or may not be achievable depending upon other system considerations such as the particular frequency range used for communication and the characteristics of the antennas and radio transceiver.

In a specific implementation of this embodiment of the present invention, a system can be designed for use in a communications system that operates in the 830 to 870 MHz range. The system should have a voltage standing-wave ratio (VSWR) of better than 2:1 and approximately 50% of the power should be transmitted to the external antenna when attached. Thus, the system can have two conditions: one with the external antenna attached and one without the external antenna attached.

With the above identified system criteria in mind, the transmission lines are chosen such that under both conditions, with and without an external antenna, the VSWR is better than 2:1. Additionally, when the external antenna is connected, approximately half of the power should be transmitted through the third transmission line leading to the external antenna.

When selecting the specifications for the transmission lines, several design considerations should be accounted for. The line length of the third transmission line leading to the external antenna is probably best set at or near 90 degrees or 180 degrees. This presents the best condition for transmitting as much power as possible to the internal antenna when there is no external antenna connected. Additionally, the impedance level of the first transmission line which is connected to the radio transceiver will typically have to be less than the desired impedance due to the transformation which occurs in the system. Also, to the extent possible, the impedance levels of the second and third transmission lines should be approximately equal to the impedance of the antennas to be attached, typically 50 ohms.

In the specific implementation discussed above, with the external and internal antennas, as well as the radio transceiver, having and looking for an impedance of 50 ohms, the following transmission line characteristics accomplish an antenna selection system built in accordance with the present invention: first transmission line to the radio transceiver, 35 ohms with a line length of 125 degrees at 850 MHz; second transmission line to the internal antenna, 50 ohms with a line length of 45 degrees at 850 MHz; and third transmission line to the optional external antenna, 50 ohms with a line length of 90 degrees at 850 MHz. Utilizing these transmission line specifications, the system will always have a voltage standing-wave ratio (VSWR) of better than 2:1 when looking into the load end of the first transmission line. This is true throughout the entire frequency range of 830 to 870 MHz and whether or not an external antenna is connected to the load end of the third transmission line. Additionally, when the external antenna is connected, the power distribution to the external antenna will be approximately half. Thus in a typical implementation, if the internal antenna has a −2 dBi gain while the external antenna has a +3 dBi gain, the performance gain will be considerable when the external antenna is connected.

Obviously, many modifications and variations of the present invention are possible in light of the above teachings. It is therefore to be understood that, within the scope of the appended claims, the invention may be practiced otherwise than as specifically described.

We claim:

1. A handheld wireless communications system, comprising:
   a computing device comprising a processor, a first antenna and a device housing, wherein the device housing includes a receiving slot; and
   a removable device comprising a radio transceiver, a second antenna and a third antenna, wherein the removable device is removably insertable into the receiving slot to form an interface between the removable device and the processor,
   wherein the handheld wireless communications system is configured to communicate over at least two frequency bands.

2. The handheld wireless communications system according to claim 1, wherein the device housing is configured to support wired access to a network.

3. The handheld wireless communications system according to claim 2, wherein the network supports telephone traffic.

4. The handheld wireless communications system according to claim 1, wherein the receiving slot is covered by a slot cover when the removable device is not removably inserted into the receiving slot.

5. The handheld wireless communications system according to claim 1, wherein the computing device is portable.

6. The handheld wireless communications system according to claim 1, wherein the computing device is a computer terminal.

7. The handheld wireless communications system according to claim 1, wherein the at least two frequency bands comprise a 900 MHz frequency band and a 2.4 GHz frequency band.

8. The handheld wireless communications system according to claim 1, wherein at least one of the computing device and the removable device supports wireless local area network communications.

9. The handheld wireless communications system according to claim 1, wherein at least one of the computing device and the removable device supports spread spectrum communications.

10. The handheld wireless communications system according to claim 1, wherein at least one of the computing device and the removable device supports frequency hopping.

11. The handheld wireless communications system according to claim 1, wherein the computing device comprises a cellular phone.

12. The handheld wireless communications system according to claim 1, wherein at least two of the first antenna, the second antenna and the third antenna are configured to support wireless communications at 2.4 GHz.

13. The handheld wireless communications system according to claim 1, wherein at least two of the first antenna, the second antenna and the third antenna are configured to support spatial diversity.

14. The handheld wireless communications system according to claim 1, wherein at least two of the first antenna, the second antenna and the third antenna are configured to support polarization diversity.

15. The handheld wireless communications system according to claim 1, wherein the first antenna, the second antenna and the third antenna are configured to support polarization diversity and the spatial diversity.

16. The handheld wireless communications system according to claim 1, wherein the first antenna, the second antenna and the third antenna are used to transmit and to receive radio frequency signals.

17. The handheld wireless communications system according to claim 1, wherein at least two of the first antenna, the second antenna and the third antenna are used in an antenna diversity scheme.

18. The handheld wireless communications system according to claim 1, wherein at least one of the first antenna, the second antenna and the third antenna is rated at an impedance of fifty ohms.

19. The handheld wireless communications system according to claim 1, wherein the computing device comprises keys and a display.

20. The handheld wireless communications system according to claim 1, wherein the computing device is a laptop computer.

21. The handheld wireless communications system according to claim 1, wherein handheld wireless communications system supports wireless communications over additional frequency bands.

22. The handheld wireless communications system according to claim 1, wherein the removable device determines which of the first antenna, the second antenna and the third antenna to use for wireless communications.

23. The hand held wireless communications system according to claim 1, wherein the removable device comprises a removable radio card.

\* \* \* \* \*